US012626925B2

(12) United States Patent
Chen et al.

(10) Patent No.: US 12,626,925 B2
(45) Date of Patent: May 12, 2026

(54) CARBON MATERIAL COMPRISING PARTICLES WITH PORE STRUCTURES, METHOD FOR PREPARING THE SAME, AND SECONDARY BATTERY AND ELECTRICAL DEVICE COMPRISING THE SAME

(71) Applicant: Contemporary Amperex Technology (Hong Kong) Limited, Hong Kong (CN)

(72) Inventors: Yonghong Chen, Ningde (CN); Rui Shen, Ningde (CN); Libing He, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/983,371

(22) Filed: Dec. 17, 2024

(65) Prior Publication Data

US 2025/0118753 A1      Apr. 10, 2025

Related U.S. Application Data

(63) Continuation of application No. PCT/CN2022/134483, filed on Nov. 25, 2022.

(51) Int. Cl.
*H01M 4/587* (2010.01)
*C01B 32/21* (2017.01)
*H01M 4/02* (2006.01)

(52) U.S. Cl.
CPC ............. *H01M 4/587* (2013.01); *C01B 32/21* (2017.08); *C01P 2002/78* (2013.01); (Continued)

(58) Field of Classification Search
CPC ........... H01M 4/587; H01M 2004/021; H01M 2004/027; H01M 4/583; C01B 32/21; (Continued)

(56) References Cited

U.S. PATENT DOCUMENTS 4,020,145 A * 4/1977 Soehngen ................. D01F 9/21
423/447.4
2011/0028708 A1 2/2011 White et al.
(Continued)

FOREIGN PATENT DOCUMENTS

CN        101350407 A       1/2009
CN        102637859 A       8/2012
(Continued)

OTHER PUBLICATIONS

Machine translation of Zhou CN-109301225-A. (Year: 2019).*
(Continued)

*Primary Examiner* — Basia A Ridley
*Assistant Examiner* — Julia Marie Fehr
(74) *Attorney, Agent, or Firm* — K&L Gates LLP

(57) ABSTRACT

A carbon material includes an external region and an internal region disposed on the inside of the external region, the external region being a region formed by extending for a distance of 0.25 L from the surface of the particles of the carbon material towards the interior of the particles, L being a short-axis length of the particles of the carbon material; total pore area of the external region being denoted as S1 and total pore area of the internal region being denoted as S2, and S2>S1. The carbon material can make the secondary battery have high initial columbic efficiency, high energy density and good cycling performance. A method for preparing the carbon material, and a secondary battery and an electrical device comprising the carbon materials are also provided.

19 Claims, 4 Drawing Sheets

100

(52) U.S. Cl.
CPC ....... *C01P 2004/61* (2013.01); *C01P 2006/11* (2013.01); *C01P 2006/12* (2013.01); *C01P 2006/40* (2013.01); *H01M 2004/021* (2013.01); *H01M 2004/027* (2013.01)

(58) Field of Classification Search
CPC .............. C01P 2002/78; C01P 2004/61; C01P 2006/11; C01P 2006/12; C01P 2006/40
See application file for complete search history.

(56) References Cited

U.S. PATENT DOCUMENTS

| | | | |
|---|---|---|---|
| 2011/0171532 A1* | 7/2011 | Okanishi | C01B 32/205 |
| | | | 252/502 |
| 2012/0074610 A1 | 3/2012 | Wu et al. | |
| 2016/0046491 A1* | 2/2016 | Mihara | C01B 32/25 |
| | | | 428/221 |
| 2017/0008769 A1 | 1/2017 | Otter et al. | |
| 2020/0031671 A1 | 1/2020 | Zhamu et al. | |
| 2020/0031677 A1 | 1/2020 | Zhamu et al. | |
| 2021/0107795 A1* | 4/2021 | Pan | C04B 35/522 |
| 2021/0280855 A1 | 9/2021 | Lee et al. | |
| 2022/0393171 A1* | 12/2022 | Zhou | C01B 32/21 |

FOREIGN PATENT DOCUMENTS

| | | | | | |
|---|---|---|---|---|---|
| CN | 106252596 A | 12/2016 | | | |
| CN | 106660798 A | 5/2017 | | | |
| CN | 107814382 A | 3/2018 | | | |
| CN | 107814383 A | 3/2018 | | | |
| CN | 109301225 A | * | 2/2019 | ........... | H01M 4/366 |
| CN | 106169584 B | 6/2019 | | | |
| CN | 106252596 B | 8/2019 | | | |
| CN | 112670464 A | 4/2021 | | | |
| CN | 113086978 A | 7/2021 | | | |
| CN | 114365305 A | 4/2022 | | | |
| CN | 114843508 A | 8/2022 | | | |
| JP | 2019507715 A | 3/2019 | | | |
| JP | 2023504472 A | 2/2023 | | | |
| JP | 2023544934 A | 10/2023 | | | |
| JP | 2023545335 A | 10/2023 | | | |
| JP | 2023550137 A | 11/2023 | | | |
| KR | 1020210068497 A | 6/2021 | | | |

OTHER PUBLICATIONS

International Search Report received in the counterpart international application PCT/CN2022/134483, mailed on Jul. 25, 2023.
Written Opinion of ISA received in the counterpart international application PCT/CN2022/134483, mailed on Jul. 25, 2023.
Notice of Allowance in the counterpart KR application No. 10-2024-7037126, mailed on Jun. 25, 2025, 8 pages with English translation.
Notice of Reasons for Refusal in the counterpart JP application No. 2024-565975, mailed on Jun. 6, 2025, 7 pages with English translation.
Notice of Allowance (with English Machine Translation), Nov. 7, 2025, for corresponding Chinese Patent Application Serial No. 202280095103.3.
Extended European Search Report, mailed Feb. 2, 2026, for corresponding European Patent Application Serial No. 22966278.8.

\* cited by examiner

CARBON MATERIAL COMPRISING PARTICLES WITH PORE STRUCTURES, METHOD FOR PREPARING THE SAME, AND SECONDARY BATTERY AND ELECTRICAL DEVICE COMPRISING THE SAME

CROSS-REFERENCE TO RELATED APPLICATION

This application is a continuation of International Application No. PCT/CN2022/134483, filed on Nov. 25, 2022, which is hereby incorporated by reference in its entirety.

TECHNICAL FIELD

The present application belongs to the field of battery technology, and specifically relates to a carbon material and the method for preparing the same, and a secondary battery and an electrical device comprising the same.

BACKGROUND

In recent years, secondary batteries have been widely used in energy storage power systems such as hydro, thermal, wind and solar power plants, as well as electric tools, electric bicycles, electric motorcycles, electric vehicles, military equipment, aerospace and many other fields. Negative electrode active materials are an important part of secondary batteries, because they affect the performances and cost of the secondary batteries. At present, the negative electrodes active materials mainly includes graphite, and natural graphite is currently receiving widespread attention due to its advantage of relatively low cost. However, natural graphite has defects such as more pores, more defects, and poor compatibility with electrolytic solution, which leads to poor cycling performance of secondary batteries. Therefore, how to improve the performance of natural graphite has become the focus of current research.

SUMMARY

The present application is intended to provide a carbon material, a method for preparing the same, and a secondary battery and an electrical device comprising the same. The carbon material provided in the present application enables the secondary battery to have high initial columbic efficiency, high energy density and good cycling performance.

A first aspect of the present application provides a carbon material comprising an external region and an internal region disposed on the inside of the external region, the external region being a region formed by extending for a distance of 0.25 L from the surface of the particles of the carbon material towards the interior of the particles, L being a short-axis length of the particles of the carbon material; total pore area of the external region being denoted as $S_1$ and total pore area of the internal region being denoted as $S_2$, and $S_2 > S_1$.

When the carbon material provided in the present application satisfies $S_2 > S_1$, the carbon material particles may have the following features: a high number of pores and/or a large pore size in the internal region and a low number of pores and/or a small pore size in the external region. The number of pores in the internal region of the carbon material particles is higher and/or the size of the pores is larger, whereby the pore structure can reserve the required expansion space for the volume change of the carbon material particles, thereby reducing the risk of fragmentation of the carbon material particles that generates new interfaces, thereby reducing the occurrence of side reactions, reducing the irreversible capacity loss of the secondary battery, and improving the cycling performance of the secondary battery; the number of pores in the external region of the carbon material particles is lower and/or the size of the pores is smaller, whereby the carbon material particles can be made to have a more stable structure, and infiltration of an electrolytic solution into the pore structure inside the carbon material particles can be avoided as much as possible, thereby being able to reduce the occurrence of side reactions, reduce the consumption of active ions for the formation of the SEI film inside the particles, and thus be able to enhance the initial coulombic efficiency of the carbon material and further improve the cycling performance of the secondary battery.

Therefore, the carbon material provided in the present application can effectively reduce the irreversible capacity loss of the secondary battery, improve the capacity exertion characteristics of the secondary battery, and enable the secondary battery to have high initial coulombic efficiency, high energy density, and good cycling performance.

In some embodiments of the present application, $1.5 \leq S_2/S_1 \leq 500$, optionally $2.5 \leq S_2/S_1 \leq 120$. When $S_2/S_1$ further satisfies the above condition, the secondary battery can better balance the high initial columbic efficiency, high energy density and good cycle performance.

In some embodiments of the present application, $0.01 \ \mu m^2 \leq S_1 \leq 10.0 \ \mu m^2$, optionally $0.1 \ \mu m^2 \leq S_1 \leq 4.5 \ \mu m^2$. When the total pore area of the external region is within the above range, on the one hand, the carbon material particles can have a more stable structure, avoiding the infiltration of an electrolytic solution into the pore structure inside the carbon material particles as much as possible, thereby reducing the side reactions and reducing the consumption of active ions by SEI film formation inside the carbon material particles. On the other hand, the transport performance of active ions and electrons will not be affected.

In some embodiments of the present application, $1.8 \ \mu m^2 \leq S_2 \leq 25.0 \ \mu m^2$, optionally $2.1 \ \mu m^2 \leq S_2 \leq 20.0 \ \mu m^2$. When the total pore area of the internal region is within the above range, on the one hand, sufficient and stable expansion space can be reserved for the volume change of the carbon material particles, thereby reducing the risk of the carbon material particles' fragmentation that generates new interfaces, reducing the side reactions on the new interface surface, and reducing the consumption of active ions by SEI film formation on the new interface surface. On the other hand, the capacity and initial columbic efficiency of carbon materials can be improved.

In some embodiments of the present application, $L \geq 5 \ \mu m$, optionally $6 \ \mu m \leq L \leq 20 \ \mu m$.

In some embodiments of the present application, the pore structure in the external region of the carbon material has an area of less than $0.15 \ \mu m^2$, optionally less than or equal to $0.10 \ \mu m^2$. By controlling the area of the pore structure in the external region of the carbon material within the above range, the external region of the carbon material can have a dense structure, which can effectively improve the structural stability of the carbon material, avoid electrolytic solution infiltration into the pore structure inside the carbon material particles as much as possible, and thus effectively improve the cycling performance of the secondary battery.

In some embodiments of the present application, the internal region of the carbon material includes more than one pore structure having an area of greater than or equal to 0.15 $\mu m^2$, optionally more than one pore structure having an area of from 0.15 $\mu m^2$ to 2.0 $\mu m^2$. By including the pore structure with the above mentioned size in the internal region of the carbon material, sufficient and stable expansion space can be reserved for the volume change of the carbon material particles, thereby reducing the risk of the carbon material particles' fragmentation. On the other hand, the compaction density of carbon materials can be improved.

In some embodiments of the present application, the interlayer spacing of the external region of the carbon material is denoted as $d_1$, the interlayer spacing of the internal region of the carbon material is denoted as $d_2$, and the carbon material satisfies $d_1 \geq d_2$, optionally $d_1 > d_2$.

When the interlayer spacing of the external region of the carbon material is larger, it is more conducive to the rapid intercalation and deintercalation of active ions, thereby further improving the dynamic performances of the secondary battery. When the interlayer spacing in the internal region of the carbon material is smaller, it is more conducive to improving the specific capacity and compaction density of the carbon material, thereby further enhancing the energy density of the secondary battery.

In some embodiments, $d_1$ is from 0.33565 nm to 0.33615 nm.

In some embodiments, $d_2$ is from 0.33557 nm to 0.33595 nm.

In some embodiments of the present application, the carbon material has a specific surface area of $\leq 2.1$ $m^2/g$, optionally from 0.7 $m^2/g$ to 1.8 $m^2/g$. The carbon material of the present application has a relatively low specific surface area and relatively low surface activity, which can reduce the consumption of active ions in SEI film formation, and improve the initial columbic efficiency of the carbon material.

In some embodiments of the present application, the carbon material has a volume distribution particle size Dv50 of 8.0 $\mu m$-25.0 $\mu m$, optionally 9.0 $\mu m$-22.0 $\mu m$.

In some embodiments of the present application, the carbon material has a volume distribution particle size Dv90 of 16.0 $\mu m$-35.0 $\mu m$, optionally 17.0 $\mu m$-34.0 $\mu m$.

When the volume distribution particle sizes Dv50 and Dv90 of carbon materials are within the above range, it is beneficial to improving the transport performance of active ions and electrons, thereby further improving the cycling and/or rate performances of the secondary battery.

In some embodiments of the present application, the carbon material has a particle size distribution (Dv90–Dv10)/Dv50 of from 0.5 to 1.5, optionally from 0.7 to 1.3. Thus it is conductive improving the compaction density of carbon materials, which can further enhance the energy density of the secondary battery.

In some embodiments of the present application, the morphology of the carbon material includes one or more of blocky, spherical, and quasi-spherical shapes. This is thereby conducive to improving the compaction density of the negative electrode plate, and thereby enhancing the energy density of the secondary battery.

In some embodiments of the present application, the carbon material has a graphitization degree of from 91.5% to 98%, optionally from 92% to 98%. When the graphitization degree of carbon materials is within the above range, it is beneficial for secondary batteries to balance high energy density and good cycling performance, storage performance, and/or rate performance.

In some embodiments of the present application, the carbon material has a powder resistivity under a pressure of 8 MPa of 0.009 $\Omega \cdot cm$-0.052 $\Omega \cdot cm$, optionally 0.01 $\Omega \cdot cm$-

0.04 $\Omega \cdot cm$. When the powder resistivity of the carbon material is within the above range, it is conductive to enhancing the electron transmission performance, so as to be able to further enhance the cycling performance and in rate performance of the secondary battery.

In some embodiments of the present application, the carbon material has a tap density of from 0.8 $g/cm^3$ to 1.50 $g/cm^3$, optionally from 0.85 $g/cm^3$ to 1.45 $g/cm^3$. When the tap density of the carbon material is within the above range, the compaction density of the negative electrode plate can be increased, thereby increasing the energy density of the secondary battery. Moreover, it is conductive to enhancing the active ion and electron transport performance, and the cycling and dynamic performances of the secondary battery can be improved.

In some embodiments of the present application, the carbon material has a specific capacity of from 350 mAh/g to 372 mAh/g, optionally from 353 mAh/g to 371 mAh/g. When the specific capacity of the carbon material is within the above range, the energy density of the secondary battery can be improved.

A second aspect of the present application provides a method for preparing a carbon material, comprising the following steps: Step 1, providing a raw material having multiple pore structures; Step 2, mixing the raw material with a filling material in a predetermined ratio homogeneously, and then keeping a first temperature $T_1$ for a first time $t_1$ to obtain an intermediate; Step 3, holding the obtained intermediate at a second temperature $T_2$ for a second time $t_2$ to obtain a carbon material, wherein the carbon material comprises an external region and an internal region disposed on the inside of the external region, the external region being a region formed by extending for a distance of 0.25 L from the surface of the particles of the carbon material towards the interior of the particles, L being a short-axis length of the particles of the carbon material; total pore area of the external region being denoted as $S_1$ and total pore area of the internal region being denoted as $S_2$, and $S_2 > S_1$.

In some embodiments of the present application, the raw material includes natural graphite, optionally the natural graphite includes one or more of flake graphite, natural spherical graphite, and microcrystalline graphite.

In some embodiments of the present application, the raw material has a volume distribution particle size Dv50 of from 8.0 $\mu m$ to 25.0 $\mu m$, optionally from 9.0 $\mu m$ to 22.0 $\mu m$.

In some embodiments of the present application, the raw material has a pore volume of 6.0 $mm^3/g$, optionally from 6 $mm^3/g$ to 100 $mm^3/g$.

By adjusting the particle size and/or pore volume of the raw material within the above range, it is possible to minimize the agglomeration of the raw material in the subsequent preparation process, whereby it is possible to reduce the problems of increased surface defects on the surface of the carbon material particles and increased surface side-reaction active sites due to the need for the depolymerization process.

In some embodiments of the present application, the filling material has a softening point of from 90° C. to 150° C., optionally from 100° C. to 140° C. When the softening point of the filling material is within the above range, it is favorable to regulating the size of the pores and/or the number of pores in the external region and the internal region of the carbon material within a suitable range.

In some embodiments of the present application, the filling material has a volume distribution particle size Dv50 of less than or equal to 6 $\mu m$, optionally from 2 $\mu m$ to 5 $\mu m$, thereby facilitating the filling of the filling material into the pore structure of the raw material after being heated and melted, and also facilitating the improvement of the dispersion uniformity of the filling material and the raw material.

In some embodiments of the present application, the filling material has a coking value of from 15% to 40%, optionally from 20% to 34%. When the coking value of the filling material is within the above range, it is advantageous to regulate the size of the pores and/or the number of pores in the external region and the internal region of the carbon material within a suitable range.

In some embodiments of the present application, the filling material comprises one or more of coal asphalt, petroleum asphalt, polymer compounds and resins, optionally one or more of coal asphalt and petroleum asphalt.

In some embodiments of the present application, a mass ratio of the filling material to the raw material is (15-30): 100, optionally (18-28):100, thereby facilitating the adjustment of the size of the pores and/or the number of pores in the external region and in the internal region of the carbon material to be within a suitable range.

In some embodiments of the present application, after mixing the raw material and filling material in a predetermined proportion homogeneously, they are heated to the first temperature $T_1$ by a staged heating process, optionally including a first heating process and a second heating process.

In some embodiments of the present application, the first heating process is carried out by heating to a temperature of from 200° C. to 250° C. and keeping this temperature for 1 to 3 hours.

In some embodiments of the present application, the second heating process is carried out by heating to the first temperature $T_1$ and keeping the first temperature $T_1$ for a first time $t_1$.

In some embodiments of the present application, it is heated to the first temperature $T_1$ at a rate of 1° C./min-10° C./min, optionally 1.5° C./min-8° C./min.

In some embodiments of the present application, the first temperature $T_1$ is from 700° C. to 1150° C., optionally from 850 to 1100° C.

In some embodiments of the present application, the first time $t_1$ is from 1 hour to 5 hours, optionally from 2 hours to 4 hours.

By adjusting one or more of the factors such as the heating rate, the first temperature, the first time, and the heating process to be within the above ranges, it is conductive to preparing the carbon material having the desired structure.

In some embodiments of the present application, the second temperature $T_2$ is from 1600° C. to 2620° C., optionally from 1800° C. to 2450° C.

In some embodiments of the present application, the second time $t_2$ is from 1.5 h to 6 h, optionally from 2 h to 5 h.

By adjusting one or more of the second temperature, second time within the above range, it is advantageous to adjust the content of disordered carbon in the carbon material within a suitable range, and it is also advantageous to prepare the carbon material having the desired structure and properties.

A third aspect of the present application provides a secondary battery, comprising a negative electrode plate comprising the carbon material according to the first aspect of the present application or the carbon material prepared by the method according to the second aspect of the present application.

A fourth aspect of the present application provides an electrical device, comprising the secondary battery according to the third aspect of the present application.

The carbon material provided in the present application can effectively reduce the irreversible capacity loss of the secondary battery, improve the capacity exertion characteristics of the secondary battery, and enable the secondary battery to combine a high initial coulombic efficiency, a high energy density, and a good cycling performance. The electrical device of the present application includes the secondary battery provided in the present application and thus has at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the accompanying drawings without creative work.

Figure 1:
FIG. 1 is a schematic diagram of a cross-sectional image of a particle of a carbon material of the present application.
Figure 1:
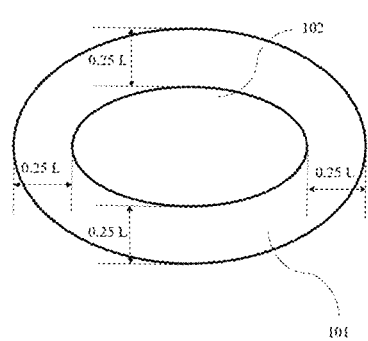

The drawings are not drawn to actual scale. Reference numerals are as follows: 1. Battery pack; 2. Upper box body; 3. Lower box body; 4. Battery module; 5. Secondary battery; 51. Casing; 52. Electrode assembly; 53. Cover plate; 100. Carbon material; 101. External region; 102. Internal region.

DETAILED DESCRIPTION

Hereinafter, embodiments of the carbon material and the method for preparing the same, and the secondary battery and the electrical device comprising the same according to present application will be described in detail with reference to the accompanying drawings as appropriate. However, unnecessary detailed descriptions may be omitted in some cases, for example the detailed description of a well-known item or the repetitive description of an actually identical structure, so as to prevent the following description from becoming unnecessarily redundant and to facilitate understanding by those skilled in the art. In addition, the drawings and the following description are provided for those skilled in the art to fully understand the present application, and are not intended to limit the subject matter described in the claims.

The "range(s)" disclosed in this application is/are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present application can be combined with each other to form a new technical solution, and such technical solution should be considered to be included in the disclosure of the present application.

Unless stated otherwise, all technical features and optional technical features of the present application can be combined with each other to form a new technical solution, and such technical solution should be considered to be included in the disclosure of the present application.

Unless stated otherwise, all steps of the present application can be carried out sequentially, and also can be carried out randomly, preferably they are carried out sequentially. For example, the method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transition phases "comprise/comprising", "include/including", and "contain/containing" mentioned in the present application mean that it is drafted in an open-ended mode, or it may also mean a close-ended mode. For example, the transition phases "comprise/comprising", "include/including", and "contain/containing" may mean that other components not listed may also be included or contained, or only the listed components may be included or contained.

In the present application herein, unless otherwise stated, the term "or" is inclusive. For example, the phrase "A or B" means "A, B, or both A and B". More specifically, any of the following conditions meets "A or B": A is true (or present) and B is false (or absent); A is false (or absent) and B is true (or present); or both A and B are true (or present).

Unless stated otherwise, the terms used in the present application have the well-known meanings commonly understood by those skilled in the art.

Unless stated otherwise, the values of the parameters mentioned in the present application may be determined by various test methods commonly used in the art, for example, according to the test methods given in the present application.

Unless stated otherwise, in the present application, the term "active ions" refers to ions, including but not limited to lithium ions, that can be intercalated and deintercalated back and forth between the positive electrode and the negative electrode of the secondary battery.

In the present application herein, the terms "multiple" and "more than one" mean two or more, unless otherwise stated and specifically limited.

According to different preparation processes or sources, graphite can be divided into artificial graphite and natural graphite. The artificial graphite generally is prepared by a high temperature graphitization process, resulting in high energy consumption and high cost. Thus, the artificial graphite has a higher cost. Natural graphite originates from nature and thus has the advantage of relatively low cost. In addition, natural graphite has the advantages of high capacity and high compaction density.

Natural graphite mainly includes flake graphite, natural spherical graphite, and microcrystalline graphite. Unlike artificial graphite, natural graphite particles have a lot of pores and defects in the interior and exterior of the particles. During the first charging process of the secondary battery, there are many side reactions between the electrolytic solution and the pores on the surface and inside the particles, resulting in high irreversible capacity loss, low initial columbic efficiency, poor cycling performance and storage performance of the secondary battery. Specifically, flake graphite and natural spherical graphite have high crystallinity and graphitization degree, and have mostly layered microstructure. Such structure leads to significant volume changes in natural graphite during the intercalation and deintercalation of active ions, which is likely to cause the fragmentation of graphite layered structure and particle. After the particles' fragmentation, the exposed fresh surface will continue to react with the electrolytic solution, which will further increase the irreversible capacity loss of the secondary battery.

At present, the performance of natural graphite is mainly improved through particle surface cladding treatment and/or particle internal filling treatment.

The cladding treatment of particle surfaces mainly involves mixing natural graphite and a cladding agent (such as asphalt and polymer compounds) evenly before heat treating to clad the surface of natural graphite particles with a layer of amorphous carbon, which can slightly repair the defects on the particle surface. However, the inventors of the present application found during the research process that the amorphous carbon layer applied on the surface can lead to a decrease in the specific capacity and/or compaction density of natural graphite, affecting the energy density of the secondary battery. At the same time, the amorphous carbon layer clad on the surface cannot effectively prevent the electrolytic solution from infiltrating into the pore structure inside the particles, resulting in limited improvement in the initial columbic efficiency, cycling performance and/or storage performance of the secondary battery.

The internal filling treatment of the particles mainly involves mixing natural graphite with filling agents (such as asphalt, polymer compounds, etc.), and filling the filling agent into the internal pores of particles through preset pressure, vacuuming, and heating, so as to obtain natural graphite without pores inside the particles. However, the inventors of the present application have found during the research that the large amount of carbon in the internal of the particles leads to a decrease in the specific capacity and compaction density of natural graphite, which affects the energy density of the secondary battery. At the same time, because all the pores inside the natural graphite particles are filled with carbon, the volume of natural graphite changes greatly during the intercalation and deintercalation of active ions, which will render the particles more prone to break up and further lead to repeated destruction and reconstruction of the SEI film on the surface of the particles; as a result, the consumption of active ions increases, the irreversible capacity loss of the secondary battery increases, and the service life of the secondary battery becomes short. In the existing technologies, the surface of natural graphite, without any pores inside the particles thereof, will be further clad with a layer of amorphous carbon, which will lead to further reducing of the specific capacity and/or compaction density of natural graphite, and at this time, there are still many defects on the surface of the particles, and thus the service life of the secondary battery cannot be effectively improved.

Therefore, the irreversible capacity loss of secondary batteries are reduced and the initial columbic efficiency of secondary batteries is increased to some extent by means of the surface cladding treatment and/or internal filling treatment of modified natural graphite particles. Nevertheless, the improvement on the initial columbic efficiency of secondary batteries is limited, and the energy density of secondary batteries will get lost. In addition, the capacity exertion characteristics of the secondary battery during long-term use remains poor.

In view of this, the inventors of the present application have proposed, after extensive research, a new type of carbon material, which combines high specific capacity, high initial coulombic efficiency, and small volume change, and also enables the secondary battery to have high initial coulombic efficiency, high energy density, and good cycling performance.

Carbon Material

In the first aspect, the present application provides a carbon material comprising an external region and an internal region disposed on the inside of the external region, the external region being a region formed by extending for a distance of 0.25 L from the surface of the particles of the carbon material towards the interior of the particles, L being a short-axis length of the particles of the carbon material; total pore area of the external region being denoted as $S_1$ and total pore area of the internal region being denoted as $S_2$, and $S_2 > S_1$.

When the carbon material provided in the present application satisfies $S_2 > S_1$, the carbon material particles may have the following features: a high number of pores and/or a large pore size in the internal region and a low number of pores and/or a small pore size in the external region. The number of pores in the internal region of the carbon material particles is higher and/or the size of the pores is larger, whereby the pore structure can reserve the required expansion space for the volume change of the carbon material particles, thereby reducing the risk of a new interface arising from the fragmentation of the carbon material particles, thereby reducing the occurrence of side reactions, reducing the irreversible capacity loss of the secondary battery, and improving the cycling performance of the secondary battery; the number of pores in the external region of the carbon material particles is lower and/or the size of the pores is smaller, whereby the carbon material particles can be made to have a more stable structure, and electrolytic solution penetration into the internal pore structure of the carbon material particles can be avoided as much as possible, thereby being able to reduce the occurrence of side reactions, reduce the consumption of active ions for the formation of the SEI film inside the particles, and thus be able to enhance the initial coulombic efficiency of the carbon material and further improve the cycling performance of the secondary battery.

Therefore, the carbon material provided in the present application can effectively reduce the irreversible capacity loss of the secondary battery, improve the capacity exertion characteristics of the secondary battery, and enable the secondary battery to have high initial coulombic efficiency, high energy density, and good cycling performance.

In some embodiments of the present application, $1.5 \leq S_2/S_1 \leq 500$, optionally $1.8 \leq S_2/S_1 \leq 250$, $2 \leq S_2/S_1 \leq 200$, $2.2 \leq S_2/S_1 \leq 150$, $2.5 \leq S_2/S_1 \leq 120$, $4 \leq S_2/S_1 \leq 120$, $5 \leq S_2/S_1 \leq 120$, $6 \leq S_2/S_1 \leq 120$. The inventors have found through further research that when $S_2/S_1$ further satisfies the above range, the secondary battery can better balance the high initial columbic efficiency, high energy density and good cycling performance.

In some embodiments of the present application, $0.01 \mu m^2 \leq S_1 \leq 10.0 \mu m^2$, optionally $0.02 \mu m^2 \leq S_1 \leq 8.0 \mu m^2$, $0.03 \mu m^2 \leq S_1 \leq 7.0 \mu m^2$, $0.04 \mu m^2 \leq S_1 \leq 6.0 \mu m^2$, $0.05 \mu m^2 \leq S_1 \leq 5.0 \mu m^2$, $0.06 \mu m^2 \leq S_1 \leq 4.5 \mu m^2$, $0.07 \mu m^2 \leq S_1 \leq 4.5 \mu m^2$, $0.09 \mu m^2 \leq S_1 \leq 4.5 \mu m^2$, $0.1 \mu m^2 \leq S_1 \leq 4.5 \mu m^2$, $0.1 \mu m^2 \leq S_1 \leq 4.0 \mu m^2$, $0.1 \mu m^2 \leq S_1 \leq 3.5 \mu m^2$. When the total pore area of the external region is within the above range, on the one hand, the carbon material particles can have a more stable structure, avoiding infiltration of an electrolytic solution into the pore structure inside the carbon material particles as much as possible, thereby reducing the side reactions and reducing the consumption of active ions by SEI film formation inside the carbon material particles. On the other hand, the transport performance of active ions and electrons will not be affected.

In some embodiments of the present application, $1.8 \mu m^2 \leq S_2 \leq 25.0 \mu m^2$, optionally $2.0 \mu m^2 \leq S_2 \leq 22.5 \mu m^2$, $2.1 \mu m^2 \leq S_2 \leq 20.0 \mu m^2$, $2.2 \mu m^2 \leq S_2 \leq 17.5 \mu m^2$, $3.0 \mu m^2 \leq S_2 \leq 15.0 \mu m^2$. When the total pore area of the internal region is within the above range, on the one hand, sufficient and stable expansion space can be reserved for the volume change of the carbon material particles, thereby reducing the risk of the carbon material particle's fragmentation that generates new interfaces, reducing the side reactions on the new interface surface, and reducing the consumption of active ions by SEI film formation on the new interface surface. On the other hand, the capacity and initial columbic efficiency of carbon materials can be improved.

In the present application, the total pore area $S_1$ of the external region and the total pore area $S_2$ of the internal region of the carbon material can be obtained by testing a cross-sectional image of the carbon material.

In the present application, the cross-sectional image of the carbon material includes a cross-sectional image passing through a particle center of the carbon material. "Particle center" means the region extending from the geometric center of the particle toward the surface of the particle for up to 0.1 μm in radius.

In the present application, the short axis length of the particle is the minimum value when a line connecting two points on the surface of the particle passes through geometric center of the particle.

FIG. 1 is a schematic diagram of a cross-sectional image of a particle of the carbon material 100 of the present application, and the cross-sectional image passes through the particle center of the carbon material 100. As shown in FIG. 1, L denotes a short-axis length of a particle of the carbon material 100, and a region formed by extending for a distance of 0.25 L from the surface of the particle of the carbon material 100 toward the interior of the particle is the external region 101, and the region inside the external region 101 is the internal region 102.

A cross-section of the carbon material can be prepared using a cross section polisher (e.g., an argon ion Cross Section Polisher IB-09010 CP from JEOL Company of Japan); the cross-section of the carbon material is then scanned using a scanning electron microscope (e.g., a Sigma 300 scanning electron microscope from e ZEISS Company of Germany) with reference to JY/T010-1996; and the cross-section of the carbon material is finally scanned by an image processing software (e.g., AVIZO) to calculate the total pore area $S_1$ of the external region and the total pore area $S_2$ of the internal region of the carbon material.

In some embodiments, $L \geq 5$ μm, optionally, $5$ μm$\leq L \leq 20$ μm, $6$ μm$\leq L \leq 20$ μm, $8$ μm$\leq L \leq 20$ μm, $8$ μm$\leq L \leq 18$ μm.

In some embodiments, the pore structure in the external region of the carbon material has an area of less than 0.15 μm², optionally less than or equal to 0.10 μm². The inventors found in further research that by controlling the area of the pore structure in the external region of the carbon material within the above range, the external region of the carbon material can be made to have a dense structure, whereby the structural stability of the carbon material can be effectively improved to avoid as much as possible the penetration of the electrolytic solution into the pore structure inside the particles of the carbon material, which can then effectively improve the cycling performance of the secondary battery. Of course, the present application does not intend to limit that all of the pore structures in the external region of the carbon material have an area of less than or equal to 0.15 μm², for example, it can be controlled that more than 95%, optionally more than 99%, of the pore structures have an area of less than or equal to 0.15 μm², optionally less than or equal to 0.10 μm².

In some embodiments, the internal region of the carbon material includes more than one pore structure having an area of greater than or equal to 0.15 μm², optionally more than one pore structure having an area of from 0.15 μm² to 2.0 μm². The inventors found in further research that by including the pore structure with the above mentioned size in the internal region of the carbon material, sufficient and stable expansion space can be reserved for the volume change of the carbon material particles, thereby reducing the risk of fragmentation of the carbon material particles. On the other hand, the compaction density of carbon materials can be improved.

In some embodiments, the interlayer spacing of the external region of the carbon material is denoted as $d_1$, the interlayer spacing of the internal region of the carbon material is denoted as $d_2$, and the carbon material satisfies $d_1 \geq d_2$, optionally $d_1 > d_2$.

When the interlayer spacing of the external region of the carbon material is larger, it is more conducive to the rapid intercalation and deintercalation of active ions, thereby further improving the dynamic performances of the secondary battery. When the interlayer spacing in the internal region of the carbon material is smaller, it is more conducive to improving the specific capacity and compaction density of the carbon material, thereby further enhancing the energy density of the secondary battery.

In some embodiments, $d_1$ is from 0.33565 nm to 0.33615 nm.

In some embodiments, $d_2$ is from 0.33557 nm to 0.33595 nm.

The interlayer spacing of different regions of carbon material particles can be tested using instruments and methods known in the art. For example, High-Resolution Transmission Electron Microscopy (HRTEM) can be used for testing. The test instrument may be Spectra S/TEM Scanning Transmission Electron Microscope from Thermo Fisher Scientific.

In some embodiments of the present application, the carbon material has a graphitization degree of from 91.5% to 98%, optionally from 92% to 98%, from 93% to 98%, or from 94% to 97.5%. When the graphitization degree of carbon materials is within the above range, it is beneficial for secondary batteries to balance high energy density and good cycling performance, storage performance, and/or rate performance.

The graphitization degree of the carbon material has the meaning known in the art, and can be tested by instruments and methods known in the art. For example, the graphitization degree may be tested by an X-ray diffractometer (such as Bruker D8 Discover) with reference to JIS K 0131-1996 and JB/T 4220-2011 to obtain the average interplanar spacing $d_{002}$ of (002) crystal planes in the crystalline structure of the carbon material, and then calculated according to the Mering-Maire Formula $g = (0.344 - d_{002})/(0.344 - 0.3354) \times 100\%$. In the above formula, $d_{002}$ is an interplanar spacing of (002) crystal planes in the crystalline structure of the carbon material, expressed in nanometers (nm).

In some embodiments, the morphology of the carbon material includes one or more of blocky, spherical, and quasi-spherical shapes. This is thereby conducive to improving the compaction density of the negative electrode plate, and thereby enhancing the energy density of the secondary battery.

In some embodiments, the carbon material comprises primary particles, and the quantity proportion of the primary particles in the carbon material is greater than or equal to 50%, for example, 55%-95%, 60%-100%, 65%-90%, 65%-80%, 70%-100%, 75%-90%, 80%-100%, 90%-100%, or 95%-100%. When the carbon material comprises an appropriate proportion of primary particles, it can be made to have high structural stability and reduce the occurrence of side reactions, and in addition, the compaction density of the negative electrode film can be enhanced, thereby enhancing the energy density of the secondary battery.

In some embodiments, all the carbon materials may be primary particles, i.e., the quantity proportion of the primary particles in the carbon materials is 100%.

In the present application, both primary particles and secondary particles have meanings well known in the art. Primary particles are particles in a non-agglomerated state. Secondary particles are particles in an agglomerated state formed by the aggregation of two or more primary particles. Primary particles and secondary particles can be distinguished by using scanning electron microscope (SEM) images.

In the present application, the quantity proportion of primary particles in the carbon material refers to the average of statistical results obtained by: taking randomly a test sample from the negative electrode film, taking randomly a plurality of test areas in the test sample, obtaining images of the plurality of test areas using a scanning electron microscope, and counting the proportion of the number of primary particles in the carbon material in each image to the total number of particles in the carbon material to obtain the average of the plurality of statistical results as the quantity proportion of primary particles in the carbon material.

In some embodiments, the carbon material has a specific surface area of ≤2.1 m$^2$/g, optionally from 0.7 m$^2$/g to 1.8 m$^2$/g. The carbon material of the present application has a relatively low specific surface area and relatively low surface activity, which can reduce the consumption of active ions in SEI film formation, and improve the initial columbic efficiency of the carbon material.

The specific surface area of the carbon material has a meaning known in the art, and can be measured by instruments and methods known in the art. For example, the specific surface area may be tested by a nitrogen adsorption specific surface area analysis test method with reference to GB/T 19587-2017, and calculated by a BET (Brunauer Emmett Teller) method. The nitrogen adsorption specific surface area analysis test may be performed by a Tri-Star 3020 specific surface area pore size analysis tester from Micromeritics, USA.

In some embodiments, the carbon material has a volume distribution particle size Dv50 of 8.0 μm-25.0 μm, optionally 9.0 μm-22.0 μm.

In some embodiments, the carbon material has a volume distribution particle size Dv90 of 16.0 μm-35.0 μm, optionally 17.0 μm-34.0 μm.

When the volume distribution particle sizes Dv50 and Dv90 of carbon materials are within the above range, it is beneficial to improving the transport performance of active ions and electrons, thereby further improving the cycling and/or rate performances of the secondary battery.

In some embodiments, the carbon material has a particle size distribution (Dv90−Dv10)/Dv50 of from 0.5 to 1.5, optionally from 0.7 to 1.3. When the particle size distribution (Dv90−Dv10)/Dv50 of the carbon material is within the above range, it is conductive improving the compaction density of carbon materials, which can further enhance the energy density of the secondary battery.

The volume distribution particle sizes Dv10, Dv50, and Dv90 of the carbon material have the meanings known in the art, which indicate the corresponding particle sizes when the cumulative volume distribution percentages of the material reach 10%, 50%, and 90%, respectively, and can be measured by instruments and methods known in the art. For example, it can be determined using a laser particle size analyzer with reference to GB/T 19077-2016 concerning the method for measuring particle size distribution with laser diffraction. The testing instrument may be a Mastersizer 3000 laser particle size analyzer from Malvern Instruments Ltd., the United Kingdom.

In some embodiments, the carbon material has a powder resistivity under a pressure of 8 MPa of from 0.009 Ω·cm to 0.052 Ω·cm, optionally from 0.01 Ω·cm to 0.04 Ω·cm. When the powder resistivity of the carbon material is within the above range, it is conductive to enhancing the electron transmission performance, so as to be able to further enhance the cycling performance and rate performance of the secondary battery.

The powder resistivity of the carbon material has a meaning that is well known in the art, and can be tested by instruments and methods known in the art. For example, it can be tested by a powder resistivity tester (e.g., ST2722 from Suzhou Lattice Electronics Co., Ltd, or UTM7305 from SUNS) using the four-probe method with reference to GB/T 30835-2014. The exemplary test method is as follows: weigh a certain amount of the sample powder to be tested in a special mold, set the test pressure, and obtain the powder resistivity under different pressures. In the present application, the test pressure can be set to 8 Mpa.

In some embodiments, the carbon material has a tap density of 0.8 g/cm$^3$-1.50 g/cm$^3$, optionally 0.85 g/cm$^3$-1.45 g/cm$^3$. When the tap density of the carbon material is within the above range, the compaction density of the negative electrode plate can be increased, thereby increasing the energy density of the secondary battery. Moreover, it is conductive to enhancing the active ion and electron transport performance, and the cycling and dynamic performances of the secondary battery can be improved.

The tap density of the carbon material has a meaning that is well known in the art, and can be determined using instruments and methods known in the art. For example, it can be determined using a powder tap density tester with reference to GB/T 5162-2006. The test instrument may be Dandong Baxter BT-301.

In some embodiments, the carbon material has a specific capacity of from 350 mAh/g to 372 mAh/g, optionally from 353 mAh/g to 371 mAh/g. When the specific capacity of the carbon material is within the above range, the energy density of the secondary battery can be improved.

The specific capacity of the carbon material has a well-known meaning in the art, and can be tested using methods well-known in the art. The exemplary test method is as follows: a carbon material sample is mixed under stirring with styrene butadiene rubber (SBR) as a binder, sodium carboxymethyl cellulose (CMC) as a thickener, and carbon black as a conductive agent in a mass ratio of 96.2:1.8:1.2:0.8 in an appropriate amount of deionized water as a solvent, to form a uniform negative electrode slurry; the negative electrode slurry is applied evenly on the surface of copper foil as the negative electrode current collector, and is kept for later use after drying in an oven; ethylene carbonate (EC), methyl ethyl carbonate (EMC), and diethyl carbonate (DEC) are mixed in a volume ratio of 1:1:1 to obtain an organic solvent, and then LiPF$_6$ is dissolved in the aforementioned organic solvent to prepare an electrolytic solution with a concentration of 1 mol/L; afterwards, a metal lithium plate is used as the counter electrode and polyethylene (PE) film is used as the separator, to assemble a CR2430 button battery in an glove box under argon protection; at 25° C., the prepared button battery is first discharged to 0.005V at a constant current of 0.15 mA, and after standing for 5 minutes, it is discharged to 0.005V at a constant current of 10 μA to record the discharging capacity at the 1$^{st}$ cycle of the button battery; afterwards, the button battery is charged to 2.0V at a constant current of 0.3 mA to recorder the charging capacity. The ratio of the charging capacity of the button battery to the mass of the carbon material sample is the specific capacity of the carbon material.

Preparation Method

A second aspect of the present application provides a method for preparing a carbon material, which may be used for preparing the carbon material according to the first aspect of the present application.

The method for preparing a carbon material comprises the following steps: Step 1, providing a raw material having multiple pore structures; Step 2, mixing the raw material with a filling material in a predetermined ratio homogeneously, and then keeping a first temperature T$_1$ for a first time t$_1$ to obtain an intermediate; Step 3, holding the obtained intermediate at a second temperature T$_2$ for a second time t$_2$ to obtain a carbon material, wherein the carbon material comprises an external region and an internal region disposed on the inside of the external region, the external region being a region formed by extending for a distance of 0.25 L from the surface of the particles of the carbon material towards the interior of the particles, L being a short-axis length of the particles of the carbon material; total pore area of the external region being denoted as $S_1$ and total pore area of the internal region being denoted as $S_2$, and $S_2 > S_1$.

In some embodiments, the raw material for preparing the carbon material includes natural graphite. Optionally, the natural graphite includes one or more of flake graphite, natural spherical graphite, and microcrystalline graphite, more optionally natural spherical graphite.

"Natural spherical graphite" refers to natural graphite having a spherical or spheroidal-like shape, and not all natural graphite particles are controlled to be ideally spherical. In some embodiments, the natural spherical graphite can be obtained by pre-treating the flake graphite to obtain the desired particle size and morphology, optionally the pre-treatment comprising processes such as crushing, grading, spheronization, purification, etc.

In some embodiments, the morphology of the raw material includes one or more of spherical and quasi-spherical shapes.

In some embodiments, the raw material has a volume distribution particle size Dv50 of 8.0 μm-25.0 μm, optionally 9.0 μm-22.0 μm. When the volume distribution particle size of the raw material is within the above ranges, it is beneficial for subsequent filling treatment.

In some embodiments, the raw material has a pore volume of ≥6.0 mm³/g, optionally from 6 mm³/g to 100 mm³/g, from 7 mm³/g to 80 mm³/g, from 8 mm³/g to 60 mm³/g, from 8 mm³/g to 40 mm³/g. When pore volume of the raw material is within the above ranges, it is beneficial for subsequent filling treatment.

By adjusting the particle size and/or pore volume of the raw material within the above range, it is possible to minimize the agglomeration of the raw material in the subsequent preparation process, whereby it is possible to reduce the problems of increased surface defects on the surface of the carbon material particles and increased surface side-reaction active sites due to the need for the depolymerization process.

In some embodiments, the filling material has a softening point of 90° C.-150° C. For example, the softening point of the filling material may be 90° C., 95° C., 100° C., 105° C., 110° C., 115° C., 120° C., 125° C., 130° C., 135° C., 140° C., 145° C., 150° C. or in a range consisting of any two of the above values. Optionally, the filling material has a softening point of 95° C.-145° C., 95° C.-140° C., 95° C.-135° C., 100° C.-145° C., 100° C.-140° C., 100° C.-135° C., 105° C.-145° C., 105° C.-140° C., 105° C.-135° C., 110° C.-145° C., 110° C.-140° C., or 110° C.-135° C.

The inventor found in the course of the research that when the softening point of the filling material is within the above range, it is favorable to regulate the size of the pores and/or the number of pores in the external region and the internal region of the carbon material in a suitable range. In addition, the following can be effectively avoided: when the softening point of the filling material is excessively high, the filling material is not easy to flow and fill into the pore structure of the raw material after being heated and melted, thereby not effectively modifying the internal defects of the particles, and not effectively preventing the electrolytic solution from infiltrating into the internal pore structure of the obtained carbon material particles, which then influences the initial coulombic efficiency and the cycling performance of the secondary battery; when the softening point of the filling material is excessively low, the filling material contains more small molecules, and these small molecules are easy to volatilize when heated, so although the filling material is easy to flow and fill into the pore structure of the raw material after being heated and melted, the small molecules in the filling material volatilize when heat treatment is carried out in Step 2 and/or Step 3, which leads to the fact that the actual residual carbon in the filling region is not able to fill in the pore structure of the raw material efficiently, and the effective filling effect is not achieved or the actual residual carbon in the filled area has more pore structures, which in turn fails to reduce the consumption of active ions by the SEI film formation and reduce the irreversible capacity loss of the secondary battery, and also affects the cycling performance and/or storage performance of the secondary battery.

In some embodiments, the filling material has a volume distribution particle size Dv50 of less than or equal to 6 μm, optionally from 1 μm to 6 μm, from 1 μm to 5 μm, from 2 μm to 5 μm, from 3 μm to 5 μm, thereby facilitating the filling of the filling material into the pore structure of the raw material after being heated and melted, and also facilitating the improvement of the dispersion uniformity of the filling material and the raw material.

In some embodiments, the filling material has a coking value of from 15% to 40%, optionally from 16% to 38%, from 16% to 35%, from 18 to 35%, from 20% to 34%. The inventor found in the course of the research that when the coking value of the filling material is within the above range, it is advantageous to regulate the size of the pores and/or the number of the pores in the external region and the internal region of the carbon material within a suitable range.

In the present application, the coking value of the filling material has a meaning known in the art and can be determined by instruments and methods known in the art. For example, it can be determined with reference to GB/T 8727-2008.

In some embodiments, the filling material has a softening point of from 100° C. to 140° C. and a coking value of from 20% to 34%. Thus, it is advantageous to regulate the size of the pores and/or the number of pores in the external region and the internal region of the carbon material within a suitable range.

In some embodiments, the filling material comprises one or more of coal asphalt, petroleum asphalt, polymer compounds and resins, optionally one or more of coal asphalt and petroleum asphalt.

In some embodiments of the present application, a mass ratio of the filling material to the raw material is (15-30): 100, optionally (18-28):100, thereby facilitating the adjustment of the size of the pores and/or the number of pores in the external region and in the internal region of the carbon material to be within a suitable range. In addition, the following can be effectively avoided: when the mass ratio of the filling material to the raw material is excessively small, the dispersion uniformity of the filling material and the raw material may become poor, at which time the filling material is not easy to flow and fill into the pore structure of the raw material after being heated and melted, thereby not effectively modifying the internal defects of the particles, and not effectively preventing the electrolytic solution from infiltrating into the internal pore structure of the obtained carbon material particles, which then influences the initial coulombic efficiency and the cycling performance of the secondary battery; when the mass ratio of filling material to raw material is excessively large, it is easy to cause the internal pore structure of raw material to be completely filled, at which time the volume of the resulting carbon material changes greatly, the particles are more prone to break up, the consumption of active ions by the SEI film formation increases, and the irreversible capacity loss of the secondary battery increases; in addition, when the mass ratio of filling material to raw material is excessively large, a large amount of filling material is left on the surface of the particles, at which time the particles are more likely to agglomerate, which not only increases the depolymerization process, but also reduces the specific capacity and compaction density of the obtained carbon material obtained.

By adjusting the parameters such as the type, the softening point, the coking value, and the addition amount of the filling material within the above range, the filling material, after being heated and melted, does not have a high viscosity, maintains good fluidity, and at the same time is not easy to bond the raw material particles, which is capable of reducing the agglomeration of the raw material particles in the subsequent preparation process, and thereby also reduces the problems such as an increase in the defects on the surface of the carbon material particles and an increase in the number of side-reaction surface-active sites and the like due to the need for additional depolymerization processes.

In some embodiments, in step 2 after mixing the raw material and filling material in a predetermined ratio homogeneously, they are heated to the first temperature $T_1$ by a staged heating process, optionally including a first heating process and a second heating process.

In some embodiments, the first heating process is carried out by heating to a temperature of from 200° C. to 250° C. and keeping this temperature for 1 to 3 hours.

In some embodiments, the second heating process is carried out by heating to the first temperature $T_1$ and keeping the first temperature $T_1$ for a first time $t_1$.

In the staged heating process, the temperature is first raised to 200° C.-250° C., and since the heating temperature is higher than the softening point of the filling material, the filling material is melted and softened by heating at this time, and keeping the temperature for 1 h-3 h can make it flow and fill the pore structure of the raw material; and after that, the temperature is raised to a first temperature $T_1$, at which time the melted and softened filling material undergoes a carbonization reaction, thereby enabling the pore structure occupied by the filling material to be effectively filled.

In some embodiments, in step 2, the first temperature $T_1$ is 700° C.-1150° C. For example the first temperature $T_1$ may be 750° C., 800° C., 850° C., 900° C., 950° C., 1000° C., 1050° C., 1100° C., or in a range consisting of any two of the above values. Optionally, the first temperature $T_1$ is 850° C.-1100° C.

During the research, the inventors have found that when the first temperature is within the above range, the size and/or number of pores in the external region and internal region of carbon materials can be advantageously adjusted to be within an appropriate range. In addition the following situations can be effectively avoided: if the first temperature is excessively low, the filling material may not be fully converted into carbon material, and during the subsequent heat treating in Step 3, it will continue to decompose into small molecule substances, resulting in the filled area having a large number of pore structures, which fails to effectively modify the internal defects of the particles, and also cannot effectively prevent the electrolytic solution from infiltrating into the pore structure inside the obtained carbon material particles, which further affects the initial columbic efficiency and cycling performance of the secondary battery; if the first temperature is excessively high, the energy consumption during the preparation process of carbon materials increases.

In some embodiments, the first time $t_1$ is 1 h-5 h. For example, the first time $t_1$ may be 1 h, 1.5 h, 2 h, 2.5 h, 3 h, 3.5 h, 4 h, 4.5 h, 5 h, or in a range consisting of any two of the above values. Optionally, the first time $t_1$ is 2 h-4 h.

The inventors have found in the course of their research that the first time within the above range is favorable to regulate the size of the pores and/or the number of pores in the external region and the internal region of the carbon material in a suitable range. In addition it can effectively avoid the following situation: when the first time is excessively short, the filling material may not be completely converted into carbon material, and will continue to be decomposed into small molecules when heat treatment is performed in the subsequent Step 3, thereby resulting in the filled area having a high number of pore structures, failing to play the role of effectively modifying the internal defects of the particles, and also failing to effectively prevent the electrolytic solution from infiltrating into the pore structures in the interior of the obtained carbon material particles, which will in turn affect the initial coulometric efficiency and cycling performance of the secondary battery; if the first time is excessively long, the energy consumption during the preparation process of carbon materials increases.

In some embodiments, in step 2, the temperature is raised up to the first temperature $T_1$ at a rate of 1° C./min-10° C./min. For example, the heating rate may be 1.5° C./min, 2° C./min, 3° C./min, 4° C./min, 5° C./min, 6° C./min, 7° C./min, 8° C./min, 9° C./min, 10° C./min, or in a range consisting of any value. Optionally, the heating rate is 1.5° C./min-8° C./min, 1.5° C./min-6° C./min, or 1.5° C./min-5° C./min.

The inventor found in the course of the research that when the heating rate is within the above range, it is favorable to regulate the size of the pores and/or the number of pores in the external region and the internal region of the carbon material within a suitable range. In addition, the following situations can be effectively avoided: when the heating rate is excessively large, the filling material may be carbonized on the surface of the raw material particles, resulting in the filling material not being able to flow easily to fill the pore structure of the raw material after being heated up and melted, and thus not being able to effectively modify the internal defects the particles, and not being able to effectively prevent the electrolytic solution from infiltrating into the internal pore structure of the obtained carbon material particles, which then affects the initial coulombic efficiency and the cycling performance of the secondary battery; when the heating rate is excessively small, the filling material is easy to flow and fill into all the pore structure of the raw material after being heated and melted, resulting in a larger volume change of the carbon material in the process of active ions' intercalation and deintercalation, and the particles are more prone to fragmentation, which will increase the consumption of active ions by the SEI film formation, increase the irreversible capacity loss of the secondary battery, and also affect the cycling performance, storage performance, and/or rate performance.

In some embodiments, the heating rate of the first heating process may be 1 C/min-10° C./min, optionally 1.5° C./min-8° C./min, 1.5° C./min-6° C./min, or 1.5° C./min-5° C./min.

In some embodiments, the heating rate of the second heating process may be 1° C./min-10° C./min, optionally 1.5° C./min-8° C./min, 1.5° C./min-6° C./min, or 1.5° C./min-5° C./min.

In some embodiments, in step 2, the heat treatment may be carried out in a vertical granulating kettle, a horizontal granulating kettle, a vertical reactor, a horizontal reactor, or a drum furnace.

In some embodiments, in step 2, atmosphere for the heating treatment may be a protective gas atmosphere. The protective gas may include one or more of nitrogen, argon and helium.

In step 2, by adjusting one or more of the heating rate, the first temperature, the first time, the heating process, etc., within the range described above, it is favorable to prepare the carbon material having the desired structure.

In some embodiments, the second temperature $T_2$ is 1600° C.-2620° C. For example, the second temperature may be 1600° C., 1700° C., 1800° C., 1900° C., 2000° C., 2100° C., 2200° C., 2300° C., 2400° C., 2500° C., 2600° C., or in a range consisting of any two of the above values. Optionally, the second temperature $T_2$ is 1800° C.-2500° C., 1800° C.-2450° C., 2000° C.-2450° C., 2050° C.-2450° C., or 2100° C.-2450° C.

The inventor found in the course of the research that when the second temperature is within the above range, it is favorable for the carbon material to have a stable structure and avoid particle fragmentation as much as possible. In addition the following situations can be effectively avoided: when the second temperature is excessively low, the content of disordered carbon in the obtained carbon material is high, which results in a high defect content of the carbon material, affecting the initial coulombic efficiency, cycling performance and storage performance of the carbon material; when the second temperature is excessively high, the content of disordered carbon in the carbon material obtained is too low, and the crystallinity and graphitization of the carbon material are high, at which time it is not conducive to the active ions' intercalation and deintercalation, while the volume change of the carbon material during the charging and discharging process is also large, thereby also increasing the risk of fragmentation of the carbon material particles, and thus affecting the cycling performance of the secondary battery; furthermore, when the second temperature is excessively high, the energy consumption and cost of the preparation process of the carbon material will be increased.

In some embodiments, the second time $t_2$ is 1.5 h-6 h. For example, the second time $t_1$ may be 2 h, 2.5 h, 3 h, 3.5 h, 4 h, 4.5 h, 5 h, 5.5 h, 6 h, or in a range consisting of any two of the above values. Optionally, the second time $t_2$ is 2 h-5 h.

The inventor found in the course of the research that when the second time is within the above range, it is favorable to regulate the disorder of the carbon material, and it is also favorable for the carbon material to have a stable structure and to avoid particle fragmentation as much as possible. In addition it can effectively avoid the following situations: when the second time is excessively short, the content of disordered carbon in the carbon material obtained is high, which leads to a high defect content of the carbon material, affecting the specific capacity and the initial coulombic efficiency of the carbon material; when the second time is excessively long, the content of disordered carbon in the obtained carbon material is too small, and the crystallinity and graphitization degree of the carbon material are very high, at which time it is not conducive to the rapid detachment and embedding of the active ions, and the second time is too long, which is conducive to the rapid intercalation and deintercalation of the active ions, and at the same time, the volume change of the carbon material during the charging and discharging process is also large, whereby the risk of fragmentation of the carbon material particles is also increased, thus affecting the cycling performance and the storage performance of the secondary battery; furthermore, when the second time is excessively long, the energy consumption and the cost of the carbon material preparation process will be increased.

In some embodiments, in Step 3, the heat treatment may be carried out in an intermediate frequency furnace, a chamber graphitization furnace, an Acheson graphitization furnace, a continuous graphitization furnace, or an inner string graphitization furnace.

In some embodiments, in Step 3, atmosphere for the heating treatment in the medium frequency furnace, continuous graphitization furnace may be a protective gas atmosphere. The protective gas may include one or more of nitrogen, argon, and helium.

By adjusting one or more of the second temperature, the second time within the above range, it is favorable to adjust the content of disordered carbon in the carbon material within a suitable range, and it is also favorable to prepare the carbon material with the desired structure and properties.

The method for preparing the carbon material of the present application is simple and safe, does not require preset pressure or vacuum treatment, and can be used without an additional depolymerization process in the heat treatment process. The carbon material prepared in the present application has small volume expansion, high structural stability and low surface activity, which can be further have high specific capacity, high initial coulombic efficiency and small volume change, and can also make the secondary battery have high initial coulombic efficiency, high energy density and good cycling performance.

The preparation method of the present application has low cost, high practicality, and is suitable for mass production.

Secondary Battery

In the third aspect, the present embodiment provides a secondary battery.

There are no specific restrictions on the types of secondary batteries in the present application, for example, the secondary battery may be a lithium-ion batteries. Normally, the secondary battery comprises a positive electrode plate, a negative electrode plate, and electrolytes. During the charging and discharging process of the secondary battery, active ions repeatedly intercalate into and deintercalate back and forth between the positive electrode plate and the negative electrode plate, and the electrolyte plays the role of conducting active ions between the positive electrode plate and the negative electrode plate. The present application has no particular limitation on the type of the electrolyte, which may be selected according to actual needs. For example, the electrolyte may be selected from at least one of a solid electrolyte and a liquid electrolyte (i.e., an electrolytic solution). In the secondary battery employing an electrolytic solution, and in some secondary batteries employing a solid electrolyte, a separator may be included, which is provided between the positive electrode plate and the negative electrode plate to serve as an isolation.

[Negative Electrode Plate]

In some embodiments, the negative electrode plate includes a negative electrode current collector and a negative film layer arranged on at least one surface of the negative electrode current collector. For example, the negative electrode current collector has two surfaces opposite in the thickness direction thereof, and the negative electrode film layer is arranged on either or both of the two opposite surfaces of the negative electrode current collector.

In some embodiments, the negative electrode film layer comprises the carbon material according to the first aspect of the present application or the carbon material prepared by the method described in the second aspect of the present application. Accordingly, the secondary battery can have high initial columbic efficiency, high energy density and good cycling performance.

In some embodiments, the negative electrode film layer may further include other negative electrode active materials in addition to the aforementioned carbon materials. In some embodiments, the other negative electrode active materials include but are not limited to one or more of conventional natural graphite, artificial graphite, soft carbon, hard carbon, silicon-based materials, tin-based materials, and lithium titanate. The silicon-based material may include one or more of elemental silicon, a silicon oxide, a silicon carbon composite, a silicon nitrogen composite, and a silicon alloy material. The tin-based material may include one or more of elemental tin, a tin oxide, and a tin alloy material.

In some embodiments, the negative electrode film layer may optionally include a negative electrode conductive agent. In the present application, the types of negative electrode conductive agents are not specially limited. For example, the negative electrode conductive agent may include one or more of superconducting carbon, conductive graphite, acetylene black, carbon black, Ketjen black, carbon dots, carbon nanotubes, graphene, and carbon nanofibers.

In some embodiments, the negative electrode film layer may optionally include a negative electrode binder. In the present application, the type of negative electrode binders is not specially limited. For example, the negative electrode binder may include one or more of styrene butadiene rubber (SBR), water-soluble unsaturated resin SR-1B, water-based acrylic resin (such as polyacrylic acid PAA, polymethyl acrylic acid PMAA, and polyacrylic acid sodium PAAS), polyacrylamide (PAM), polyvinyl alcohol (PVA), sodium alginate (SA), and carboxymethyl chitosan (CMCS).

In some embodiments, the negative electrode film layer may optionally include other additives. For example, other additives may include a thickener, such as sodium carboxymethyl cellulose (CMC), and a PTC thermistor material.

In some embodiments, the negative electrode current collector may be a metal foil or composite current collector. As an example of the metal foil, a copper foil may be used. The composite current collector may include a polymeric material base layer and a metal material layer formed on at least one surface of the polymeric material base layer. As an example, the metal material may comprise one or more of copper, copper alloy, nickel, nickel alloy, titanium, titanium alloy, silver, and silver alloy, and the polymeric material base layer may include one or more of polypropylene (PP), polyethylene terephthalate (PET), polybutylene terephthalate (PBT), polystyrene (PS), and polyethylene (PE).

The negative electrode film layer is usually formed by applying the negative electrode slurry on the negative electrode current collector, drying, and cold pressing. The negative electrode slurry is usually formed by dispersing the negative electrode active material, optional conductive agent, optional binder, and other optional additives in a solvent and stirring evenly. The solvent may be N-methylpyrrolidone (NMP) or deionized water, but is not limited thereto.

The negative electrode plate does not exclude other additional functional layers than the negative electrode film layer. For example, in some embodiments, the negative electrode plate described in the present application further includes a conductive primer layer sandwiched between the negative electrode current collector and the negative electrode film layer, arranged on the surface of the negative electrode current collector (for example, composed of a conductive agent and a binder). In some embodiments, the negative electrode plate described in the present application also includes a protective layer covering on the surface of the negative electrode film layer.

[Positive Electrode Plate]

In some embodiments, the positive electrode plate includes a positive electrode current collector and a positive electrode film layer arranged on at least one surface of the positive electrode current collector. For example, the positive electrode current collector has two surfaces opposite in the thickness direction thereof, and the positive electrode film layer is arranged on either or both of the two opposite surfaces of the positive electrode current collector.

The positive electrode current collector may be a metal foil or composite current collector. For example, the metal foil may be an aluminum foil. The composite current collector may include a polymeric material base layer and a metal material layer formed on at least one surface of the polymeric material base layer. For example, the metal material may include one or more of aluminum, aluminum alloys, nickel, nickel alloys, titanium, titanium alloys, silver, and silver alloys. For example, the polymeric material base layer may include one or more of polypropylene (PP), polyethylene terephthalate (PET), polybutylene terephthalate (PBT), polystyrene (PS), and polyethylene (PE).

The positive electrode film layer typically includes a positive electrode active material, optional binder, and optional conductive agent. The positive electrode film layer is usually formed by applying the positive electrode slurry on the positive electrode current collector, drying, and cold pressing. The positive electrode slurry is usually formed by dispersing the positive electrode active material, optional conductive agent, optional binder, and any other components in a solvent and stirring evenly. The solvent may be N-methylpyrrolidone (NMP), but is not limited thereto. As an example, the positive electrode binder may include one or more selected from polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoroacrylate resin. As an example, the positive electrode conductive agent may include one or more selected from superconducting carbon, conductive graphite, acetylene black, carbon black, Ketjen black, carbon dots, carbon nanotubes, graphene, and carbon nanofibers.

The positive electrode active material may be a positive electrode active material commonly known in the art for secondary batteries.

When the secondary battery of the present application is a lithium-ion battery, the positive electrode active material may include at least one of lithium transition metal oxide, lithium-containing phosphate, or their respective modified compounds. Examples of the lithium transition metal oxide may include, but are not limited to, at least one of lithium cobalt oxide, lithium nickel oxide, lithium manganese oxide, lithium nickel cobalt oxide, lithium manganese cobalt oxide, lithium nickel manganese oxide, lithium nickel cobalt aluminium oxide, or modified compounds thereof. Examples of the lithium-containing phosphate may include, but are not limited to, at least one of lithium iron phosphate, a composite of lithium iron phosphate and carbon, lithium manganese phosphate, a composite of lithium manganese phosphate and carbon, lithium ferromanganese phosphate, a composite of lithium ferromanganese phosphate and carbon, or their respective modified compounds.

In some embodiments, in order to further increase the energy density of the secondary battery, the positive electrode active material for the lithium-ion battery may include one or more of the lithium transition metal oxides with the formula $Li_aNi_bCO_cM_dO_eA_f$ and modified compounds thereof, in which $0.8 \leq a \leq 1.2$, $0.5 \leq b<1$, $0<c<1$, $0<d<1$, $1 \leq e \leq 2$, $0 \leq f \leq 1$, M is one or more selected from Mn, Al, Zr, Zn, Cu, Cr, Mg, Fe, V, Ti, and B, and A is one or more selected from N, F, S, and Cl.

In some embodiments, as an example, the positive electrode active material for a lithium-ion battery may include one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.6}Co_{0.1}Mn_{0.1}O_2$ (NCM811), $LiNi_{0.85}Co_{0.15}Al_{0.05}O_2$, $LiFePO_4$ and $LiMnPO_4$.

In the present application, the modified compounds of the foregoing positive electrode active materials may undergo doping modification and/or surface coating modification of the positive electrode active materials.

[Electrolyte]

In some embodiments, the electrolyte is an electrolytic solution comprising an electrolyte salt and an organic solvent.

The type of the electrolyte salt is not specifically limited and may be selected according to actual needs.

When the secondary battery of the present application is a lithium-ion battery, as an example, the electrolyte salt may include one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluorooxalate (LiDFOB), lithium bisoxalate (LiBOB), lithium difluorophosphate ($LiPO_2F_2$), lithium difluorobisoxalate phosphate (LiDFOP), and lithium tetrafluorooxalate phosphate (LiTFOP).

The type of the solvent is not specifically limited and may be selected according to actual needs. As an example, the organic solvent may include one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butyl carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and ethylsulfonylethane (ESE).

In some embodiments, the electrolytic solution may further optionally include additives. For example, the additives may include a negative electrode film-forming additive, a positive electrode film-forming additive, as well as additives that can improve certain performance of secondary batteries, such as an additive that improves overcharge performance of batteries, an additive that improves high-temperature performance of batteries, and an additive that improves low-temperature power performance of batteries.

[Separator]

There is no particular limitation on the type of the separator in the present application. The separator may be any known porous separator with good chemical and mechanical stability.

In some embodiments, the material of the separator may include one or more of glass fibers, a non-woven fabric, polyethylene, polypropylene, and polyvinylidene fluoride. The separator may be a single-layer thin film or a multi-layer composite thin film without special limitations. When the separator is a multi-layer composite thin film, materials of various layers may be the same or different.

In some embodiments, the positive electrode plate, the negative electrode plate, and the separator may be manufactured into an electrode assembly through a winding process or a stacking process.

In some embodiments, the secondary battery may include an outer package. The outer package may be used to encapsulate the electrode assembly and electrolyte.

In some embodiments, the outer package of the secondary battery may be a hard case, such as a hard plastic case, an aluminum case, a steel case, and the like. The outer package of the secondary battery may also be a soft package, such as a pouch-type soft package. A material of the soft bag can be plastic, such as one or more of polypropylene (PP), polybutylene terephthalate (PBT), and polybutylene succinate (PBS).

Figure 2:
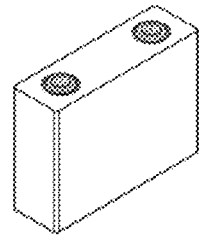
FIG. 2 is a schematic diagram of a secondary battery according to an embodiment of the present application.

The shape of the secondary battery is not particularly limited in the present application, and it may be cylindrical, square, rectangular or any other shape. FIG. 2 is a schematic diagram of a secondary battery 5 of a rectangular structure as an example.

Figure 3:
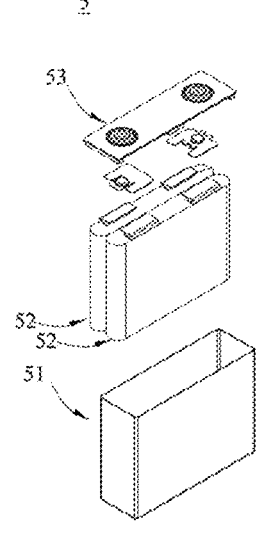
FIG. 3 is an exploded view of a secondary battery according to the embodiment of the present application.

In some embodiments, as shown in FIG. 3, the outer package may include a casing 51 and a cover plate 53, wherein the casing 51 may include a bottom plate and side plates connected to the bottom plate, and the bottom plate and the side plates enclose and form an accommodating cavity. The casing 51 has an opening communicating with the accommodating cavity, and the cover plate 53 is used to cover the opening to close the accommodating cavity. A positive electrode plate, a separator, and a negative electrode plate may be made into an electrode assembly 52 by a winding process or a stacking process. The electrode assembly 52 is packaged in the accommodating cavity, and the electrolytic solution is infiltrated in the electrode assembly 52. The number of electrode assemblies 52 contained in the secondary battery 5 may be one or several, and may be adjusted according to requirements.

The method for preparing the secondary battery in the present application is well-known. In some embodiments, the positive electrode plate, the separator, the negative electrode plate, and the electrolytic solution may be assembled to form the secondary battery. As an example, the positive electrode plate, the separator, and the negative electrode plate may form an electrode assembly through a winding or stacking process, the electrode assembly is placed in an outer package and dried, then the electrolytic solution is injected, followed by vacuum packaging, standing, formation, shaping, and other processes, thereby obtaining the secondary battery.

In some embodiments of the present application, the secondary batteries according to the present application can be assembled into a battery module, and the number of secondary batteries contained in the battery module can be more than one, and the specific number can be adjusted according to application and capacity of the battery module.

Figure 4:
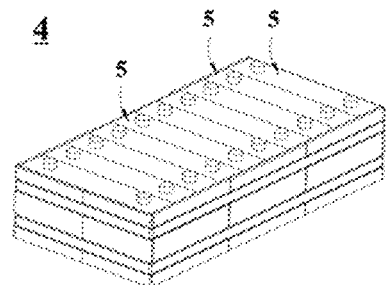
FIG. 4 is a schematic diagram of a battery module according to an embodiment of the present application.

FIG. 4 is a schematic diagram of the battery module 4 as an example. As shown in FIG. 4, in the battery module 4, a plurality of secondary batteries 5 may be arranged in sequence along the longitudinal direction of the battery module 4. Certainly, they can also be arranged in any other manner. Furthermore, a plurality of secondary batteries 5 can be fixed with fasteners.

Optionally, the battery module 4 may further include a housing having an accommodating space in which a plurality of secondary batteries 5 are accommodated.

In some embodiments, the above-mentioned battery modules can also be assembled into a battery pack, and the number of battery modules included in the battery pack can be adjusted according to the application and capacity of the battery pack.

Figure 5:
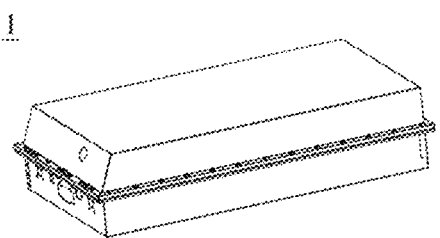
FIG. 5 is a schematic diagram of a battery pack according to an embodiment of the present application.
Figure 6:
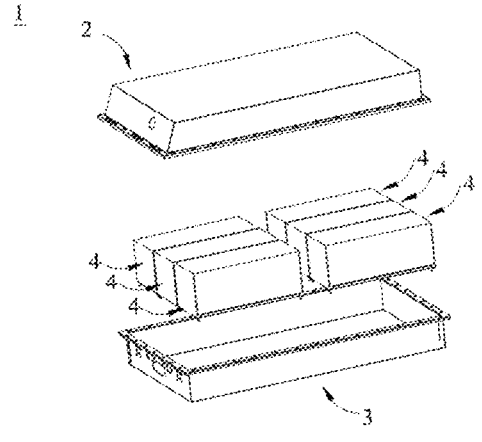
FIG. 6 is an exploded view of the battery pack according to the embodiment of the present application as shown in FIG. 5.

FIGS. 5 and 6 are schematic diagrams of the battery pack 1 as an example. As shown in FIGS. 5 and 6, the battery pack 1 may include a battery case and a plurality of battery modules 4 provided in the battery case. The battery box includes an upper case body 2 and a lower case body 3, and the upper case body 2 is used to cover the lower case body 3 to form a closed space for accommodating the battery modules 4. A plurality of battery modules 4 may be arranged in the battery case in any manner.

Electrical Device

The present application further provides an electrical device comprising at least one of the secondary battery, battery module, or battery pack of the present application. The secondary battery, battery module or battery pack can be used as a power source of the electrical device, and can also be used as an energy storage unit of the electrical device. The electrical device can be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The electrical device can select to use a secondary battery, a battery module or a battery pack according to its usage requirements.

Figure 7:
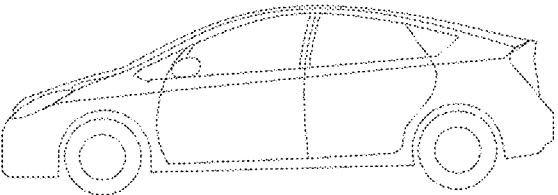
FIG. 7 is a schematic diagram of an electrical device according to an embodiment of the present application using the secondary battery of the present application as power.

FIG. 7 is a schematic diagrams of an electrical device as an example. The electrical device is a pure electric vehicle, a hybrid electric vehicle, or a plug-in hybrid electric vehicle. In order to meet high power and high energy density requirements of the electrical device, a battery pack or a battery module can be used.

As another example, the electrical device may be a mobile phone, a tablet computer, a notebook computer, and the like. The electrical device is generally required to be light and thin, and a secondary battery can be used as a power source.

EXAMPLES

The following examples more specifically describe the content disclosed in the present application, and these examples are only used for explanatory description, because various modifications and changes within the scope of the present disclosure are apparent to those skilled in the art. Unless otherwise stated, all parts, percentages, and ratios described in the following examples are based on weight, and all reagents used in the examples are commercially available or synthesized according to conventional methods and can be directly used without further treatment, and all instruments used in the examples are commercially available.

Example 1

(1) Preparation of Carbon Material

Step 1:100 mesh flake graphite was mechanical crushed, graded, spheroidized, and purified, to obtain natural spherical graphite having a volume distribution particle size Dv50 of 15 μm and a pore volume of 18 $mm^3/g$.

Step 2: The obtained natural spherical graphite and petroleum asphalt (having a softening point of 120° C., a volume distribution particle size Dv50 of 5 μm, and a coking value of 30%) were mixed at a mass ratio of 100:20 in a VC mixer for 30 minutes, and then the mixed materials were placed in a drum furnace, where the temperature was raised at a rate of 5° C./min to 225° C. and was kept for 1 hours (the first heating process), and then the temperature was raised at a rate of 5° C./min to 900° C. and was kept for 2 hours (the second heating process). Then, the temperature was cooled to room temperature to obtain the intermediate.

Step 3: The obtained intermediate was placed in the Acheson graphitization furnace, and the temperature was raised to 1900° C. and kept for 3 hours. After demagnetizing and sieving, the carbon material was obtained.

(2) Preparation of Button Battery (Half-Cell)

The above prepared carbon material was mixed with the styrene butadiene rubber (SBR) as a binder, sodium carboxymethyl cellulose (CMC) as a thickener, and carbon black as a conductive agent in an appropriate amount of solvent deionized water in a mass ratio of 96.2:1.8:1.2:0.8, to form a uniform negative electrode slurry; the negative electrode slurry was applied evenly on the surface of the negative electrode current collector copper foil, and dried in an oven for later use. Ethylene carbonate (EC), methyl ethyl carbonate (EMC), and diethyl carbonate (DEC) were mixed in a volume ratio of 1:1:1 to obtain an organic solvent. Then, $LiPF_6$ was dissolved in the aforementioned organic solvent to prepare an electrolytic solution with a concentration of 1 mol/L. Afterwards, a CR2430 button battery was assembled in an argon protected glove box by using a metal lithium sheet as the counter electrode and polyethylene (PE) film as the separator.

(3) Preparation of Secondary Battery (Full-Cell)

The above prepared carbon material, carbon black (Super P) as a conductive agent, styrene butadiene rubber as a binder, and sodium carboxymethyl cellulose as a thickener were mixed in an appropriate amount of solvent deionized water in a weight ratio of 96:1:1:2 to form a negative electrode slurry. The negative electrode slurry was applied onto the two surfaces of the negative electrode current collector copper foil, and after drying and cold pressing, the negative electrode plate was obtained.

$LiFePO_4$, conductive carbon black and polyvinylidene fluoride were mixed in a weight ratio of 96:2.5:1.5, then an appropriate amount of solvent NMP was added under homogeneous stirring, to obtain the positive electrode slurry. The positive electrode slurry was applied onto the two surfaces of the positive electrode current collector aluminum foil, and after drying and cold pressing, the positive electrode plate was obtained.

The polypropylene film having a thickness of 12 μm was used as a separator, and was placed with the positive and negative electrode plates prepared above in sequence, so that the separator was between the positive and negative electrode plates to play a role of isolation; then they were wound to obtain the electrode assembly; the electrode assembly was placed in the outer packaging and dried, after which the electrolytic solution identical to that for the preparation of the button battery was injected. After vacuum encapsulation, standing, chemical formation, capacity grading, and other processes, the secondary battery was obtained.

Comparative Example 1

The methods for preparing half-cells and full-cells were similar to those of Example 1, except that the method for preparing the carbon materials was different.

Mechanical crushing, grading, spheroidization, and purification of 100 mesh flake graphite were carried out to obtain natural spherical graphite with a volume distribution particle size Dv50 of 15 μm and a pore volume of 18 mm³/g. Then the obtained natural spherical graphite was used as a carbon material to prepare half-cells and full-cells.

Comparative Example 2

The methods for preparing half-cells and full-cells were similar to those of Example 1, except that the method for preparing the carbon materials was different.

Mechanical crushing, grading, spheroidization, and purification of 100 mesh flake graphite were carried out to obtain natural spherical graphite with a volume distribution particle size Dv50 of 15 μm and a pore volume of 18 mm³/g. The obtained natural spherical graphite and petroleum asphalt (having a softening point of 120° C., a volume distribution particle size Dv50 of 5 μm, and a coking value of 30%) were mixed at a mass ratio of 100:20 in a VC mixer for 30 minutes, and then the mixed materials were graphitized at 3200° C. for 10 hours. After cooled to room temperature, the carbon material was obtained.

Comparative Example 3

The methods for preparing half-cells and full-cells were similar to those of Example 1, except that the method for preparing the carbon materials was different.

Mechanical crushing, grading, spheroidization, and purification of 100 mesh flake graphite were carried out to obtain natural spherical graphite with a volume distribution particle size Dv50 of 15 μm and a pore volume of 18 mm³/g. The obtained natural spherical graphite and petroleum asphalt (having a softening point of 120° C., a volume distribution particle size Dv50 of 5 μm, and a coking value of 30%) were mixed at a mass ratio of 100:20 in a VC mixer for 30 minutes, and then the mixed materials were graphitized at 1300° C. for 2 hours. After cooled to room temperature, the carbon material was obtained.

Comparative Example 4

The methods for preparing half-cells and full-cells were similar to those of Example 1, except that the method for preparing the carbon materials was different.

Mechanical crushing, grading, spheroidization, and purification of 100 mesh flake graphite were carried out to obtain natural spherical graphite with a volume distribution particle size Dv50 of 15 μm and a pore volume of 18 mm³/g. The obtained natural spherical graphite and petroleum asphalt (having a softening point of 120° C., a volume distribution particle size Dv50 of 5 μm, and a coking value of 30%) were mixed in a VC mixer for 30 minutes. Then the mixed materials were put into the reactor, which was heated stepwise at a heating rate of 2° C./min under evenly stirring. After the temperature was raised to 190° C., the reactor was vacuumed to a pressure of to −0.1 MPa, and held for 2 hours; afterwards, the reactor was heated up to 650° C. and held for 2 hours, then cooled to a temperature of to about 160° C., after which petroleum asphalt was slowly added in the reactor in an amount that was 1:1 in mass relative to the amount of the petroleum asphalt added previously. Then, the reactor was heated to 190° C. again, vacuumed to the pressure of −0.1 MPa, and held for 2 hours; afterwards, it was heated to 650° C. again and held for 2 hours, and then cooled via condensation. At last, the materials treated by the above process were heat-treated at 1300° C. for 2 hours, and then were crushed and sieved to obtain a carbon material without internal pores.

Examples 2 to 28

The half-cells and full-cells were prepared according to the methods similar to those of Example 1, except that the preparation process parameters of the carbon material were adjusted, as detailed in Table 1.

TABLE 1

| No. | Raw material Dv50 (μm) | Raw material Pore volume (mm³/g) | Filling material Softening point (° C.) | Filling material Dv50 (μm) | Filling material Coking value | Mass ratio of raw material to filling material | Step 2 First heating process Heating rate (° C./min) | Step 2 First heating process Holding temperature (° C.) | Step 2 First heating process Holding time (h) | Step 2 Second heating process Heating rate (° C./min) | Step 2 Second heating process Holding temperature (° C.) | Step 2 Second heating process Holding time (h) | Step 3 Holding temperature (° C.) | Step 3 Holding time (h) |
|---|---|---|---|---|---|---|---|---|---|---|---|---|---|---|
| Example 1 | 15 | 18 | 120 | 5 | 30% | 100:20 | 5 | 225 | 1 | 5 | 900 | 2 | 1900 | 3 |
| Example 2 | 15 | 18 | 120 | 5 | 30% | 100:20 | 5 | 200 | 1 | 5 | 900 | 1 | 2000 | 2 |
| Example 3 | 15 | 18 | 120 | 5 | 30% | 100:20 | 5 | 225 | 1.5 | 5 | 1000 | 2.5 | 2100 | 3 |
| Example 4 | 15 | 18 | 120 | 5 | 30% | 100:25 | 5 | 225 | 1.5 | 5 | 1000 | 3 | 2250 | 5 |
| Example 5 | 15 | 18 | 120 | 5 | 30% | 100:25 | 5 | 250 | 2 | 5 | 1100 | 3.5 | 2400 | 4 |
| Example 6 | 15 | 18 | 120 | 5 | 30% | 100:25 | 5 | 250 | 2.5 | 5 | 1100 | 4 | 2450 | 5 |
| Example 7 | 15 | 18 | 120 | 5 | 30% | 100:30 | 5 | 250 | 3 | 5 | 1100 | 5 | 2500 | 6 |
| Example 8 | 15 | 18 | 120 | 5 | 30% | 100:35 | 5 | 300 | 4 | 5 | 1100 | 5 | 2500 | 6 |

TABLE 1-continued

| No. | Raw material | | Filling material | | | Mass ratio of raw material to filling material | Step 2 | | | | | | Step 3 | |
|---|---|---|---|---|---|---|---|---|---|---|---|---|---|---|
| | | | | | | | First heating process | | | Second heating process | | | | |
| | | | | | | | | Holding | | | Holding | | Holding | |
| | Dv50 (μm) | Pore volume (mm³/g) | Softening point (°C.) | Dv50 (μm) | Coking value | to filling material | Heating rate (°C./min) | temperature (°C.) | Holding time (h) | Heating rate (°C./min) | temperature (°C.) | Holding time (h) | temperature (°C.) | Holding time (h) |
| Example 9 | 15 | 18 | 80 | 5 | 15% | 100:20 | 5 | 225 | 1.5 | 5 | 1000 | 3 | 2250 | 5 |
| Example 10 | 15 | 18 | 90 | 5 | 16% | 100:20 | 5 | 225 | 1.5 | 5 | 1000 | 3 | 2250 | 5 |
| Example 11 | 15 | 18 | 110 | 5 | 28% | 100:20 | 5 | 225 | 1.5 | 5 | 1000 | 3 | 2250 | 5 |
| Example 12 | 15 | 18 | 130 | 5 | 32% | 100:20 | 5 | 225 | 1.5 | 5 | 1000 | 3 | 2250 | 5 |
| Example 13 | 15 | 18 | 150 | 5 | 35% | 100:20 | 5 | 225 | 1.5 | 5 | 1000 | 3 | 2250 | 5 |
| Example 14 | 15 | 18 | 200 | 5 | 40% | 100:20 | 5 | 225 | 1.5 | 5 | 1000 | 3 | 2250 | 5 |
| Example 15 | 15 | 18 | 120 | 5 | 30% | 100:20 | 1 | 225 | 1.5 | 5 | 1000 | 3 | 2250 | 5 |
| Example 16 | 15 | 18 | 120 | 5 | 30% | 100:20 | 3 | 225 | 1.5 | 5 | 1000 | 3 | 2250 | 5 |
| Example 17 | 15 | 18 | 120 | 5 | 30% | 100:20 | 8 | 225 | 1.5 | 5 | 1000 | 3 | 2250 | 5 |
| Example 18 | 15 | 18 | 120 | 5 | 30% | 100:20 | 10 | 225 | 1.5 | 5 | 1000 | 3 | 2250 | 5 |
| Example 19 | 15 | 18 | 120 | 5 | 30% | 100:20 | 5 | 225 | 1.5 | 5 | 600 | 3 | 2250 | 5 |
| Example 20 | 15 | 18 | 120 | 5 | 30% | 100:20 | 5 | 225 | 1.5 | 5 | 700 | 3 | 2250 | 5 |
| Example 21 | 15 | 18 | 120 | 5 | 30% | 100:20 | 5 | 225 | 1.5 | 5 | 850 | 3 | 2250 | 5 |
| Example 22 | 15 | 18 | 120 | 5 | 30% | 100:20 | 5 | 225 | 1.5 | 5 | 950 | 3 | 2250 | 5 |
| Example 23 | 15 | 18 | 120 | 5 | 30% | 100:20 | 5 | 225 | 1.5 | 5 | 1100 | 3 | 2250 | 5 |
| Example 24 | 15 | 18 | 120 | 5 | 30% | 100:20 | 5 | 225 | 1.5 | 5 | 1200 | 3 | 2250 | 5 |
| Example 25 | 8 | 18 | 120 | 5 | 30% | 100:25 | 5 | 225 | 1.5 | 5 | 1000 | 3 | 2250 | 5 |
| Example 26 | 12 | 18 | 120 | 5 | 30% | 100:25 | 5 | 225 | 1.5 | 5 | 1000 | 3 | 2250 | 5 |
| Example 27 | 20 | 18 | 120 | 5 | 30% | 100:25 | 5 | 225 | 1.5 | 5 | 1000 | 3 | 2250 | 5 |
| Example 28 | 25 | 18 | 120 | 5 | 30% | 100:25 | 5 | 225 | 1.5 | 5 | 1000 | 3 | 2250 | 5 |

Performance Tests (1) Test of the Total Pore Area in the External Region and Internal Region of Carbon Materials The binder for making sample was evenly mixed with carbon material powder and then the mixture was applied on the copper foil, drying at 60° C. for 30 minutes; the samples were cut into pieces of 6 mm×6 mm and then were pasted on the sample stage of CP-type Argon Ion Cross-Section Polisher; the samples were cut using a plasma beam to obtain the cross-section of the carbon material, the cross-section of the carbon material passed through the center of the carbon material particles. The test instrument may be IB-09010 CP Argon Ion Cross-Section Polisher from JEOL, Japan.

The cross-section of the carbon materials were scanned using a scanning electron microscope. The test may be conducted according to JY/T010-1996. The test instrument may be Sigma 300 Scanning Electron Microscope from ZEISS, Germany.

The region formed by extending for a distance of 0.25 L from the surface of the particles of the carbon material to the inside of the particles was noted as the external region, the region inside the external region was noted as the internal region, and L denoted the short-axis length of the particles of the carbon material. A total pore area $S_1$ of the external region of the carbon material and a total pore area $S_2$ of the internal region of the carbon material were calculated using an image processing software. The image processing software may be AVIZO.

(2) Test of the Initial Columbic Efficiency of Carbon Materials

The button battery as prepared above was firstly discharged to current of 0.005V at a constant current of 0.15 mA at 25° C., standing for 5 minutes, and then was discharged to 0.005V at a constant current of 10 μA, the discharging capacity of the button battery in the $1^{st}$ cycle was recorded; afterwards, it was charged to 2.0V at a constant current of 0.3 mA and the charging capacity of the button battery in the $1^{st}$ cycle was recorded. The initial columbic efficiency of carbon materials (%)=charging capacity of button battery in the $1^{st}$ cycle/discharging capacity of button battery in the $1^{st}$ cyclex 100%.

(3) Cycling Performance of Secondary Batteries

At 25° C., the secondary battery as prepared above was charged at a constant current of 0.5 C to the upper limit cutoff voltage (corresponding to 100% SOC), then charged at the constant voltage to a current of 0.05 C, kept standing for 5 minutes, and was discharged at a constant current of 0.5 C to the lower limit cutoff voltage (corresponding to 0% SOC). The discharging capacity at this time was recorded as the initial discharging capacity. The secondary battery was charged and discharged for cycles according to the above method, and the discharging capacity for each cycle was recorded, until the discharging capacity of the secondary battery decayed to 80% of the initial discharging capacity, and the number of cycles at this time was recorded.

TABLE 2

| No. | Carbon material | | | Performance of battery | |
|---|---|---|---|---|---|
| | | | | Initial | |
| | $S_1$ ($\mu m^2$) | $S_2$ ($\mu m_2$) | $S_2/S_1$ | coulombic efficiency | Number of cycles |
| Comparative Example 1 | 13.80 | 9.60 | 0.70 | 89.70% | 2000 |
| Comparative Example 2 | 12.25 | 9.36 | 0.76 | 91.90% | 4100 |
| Comparative Example 3 | 12.08 | 9.25 | 0.77 | 92.80% | 4000 |
| Comparative Example 4 | 0.05 | 0.04 | 0.80 | 92.90% | 4500 |
| Example 1 | 0.80 | 9.30 | 11.63 | 93.50% | 6500 |
| Example 2 | 1.30 | 9.59 | 7.38 | 93.10% | 6200 |
| Example 3 | 0.30 | 8.50 | 28.33 | 94.20% | 6800 |
| Example 4 | 0.15 | 7.20 | 48.00 | 95.20% | 7500 |
| Example 5 | 0.14 | 6.43 | 45.93 | 95.10% | 6800 |
| Example 6 | 0.12 | 5.84 | 48.67 | 94.90% | 6500 |
| Example 7 | 0.09 | 3.03 | 33.67 | 94.80% | 6300 |
| Example 8 | 0.05 | 2.26 | 45.20 | 94.60% | 6200 |
| Example 9 | 1.32 | 7.89 | 5.98 | 93.00% | 6250 |
| Example 10 | 0.61 | 7.54 | 12.36 | 93.90% | 7100 |
| Example 11 | 0.23 | 7.25 | 31.52 | 94.60% | 7500 |
| Example 12 | 0.35 | 8.19 | 23.40 | 93.80% | 7200 |
| Example 13 | 0.69 | 9.28 | 13.45 | 94.20% | 6800 |
| Example 14 | 1.98 | 9.64 | 4.87 | 93.10% | 6120 |
| Example 15 | 0.02 | 2.80 | 140 | 94.90% | 6000 |
| Example 16 | 0.10 | 5.30 | 53.00 | 95.40% | 6900 |
| Example 17 | 0.50 | 8.86 | 17.72 | 94.80% | 7200 |
| Example 18 | 1.50 | 9.21 | 6.14 | 93.50% | 6350 |
| Example 19 | 1.23 | 7.89 | 6.41 | 93.10% | 6200 |
| Example 20 | 0.69 | 7.64 | 11.07 | 93.80% | 6500 |
| Example 21 | 0.35 | 7.35 | 21.00 | 94.30% | 6800 |
| Example 22 | 0.24 | 7.29 | 30.38 | 94.70% | 6900 |
| Example 23 | 0.15 | 7.17 | 47.80 | 94.90% | 7000 |
| Example 24 | 0.16 | 7.12 | 44.50 | 94.50% | 7000 |
| Example 25 | 0.07 | 2.10 | 30.00 | 94.50% | 6900 |
| Example 26 | 0.07 | 4.89 | 69.86 | 94.90% | 6950 |
| Example 27 | 6.50 | 14.50 | 2.23 | 93.70% | 6050 |
| Example 28 | 8.00 | 17.30 | 2.16 | 93.20% | 5900 |

Figure 8:
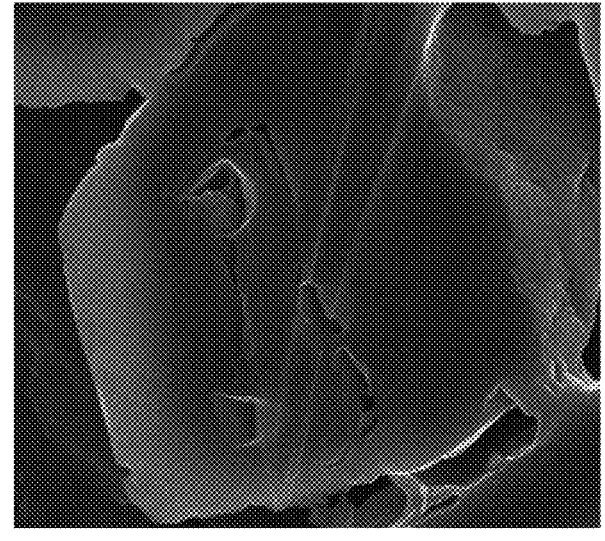
FIG. 8 is the X-ray diffraction pattern of the carbon material prepared in Example 4.
Figure 9:
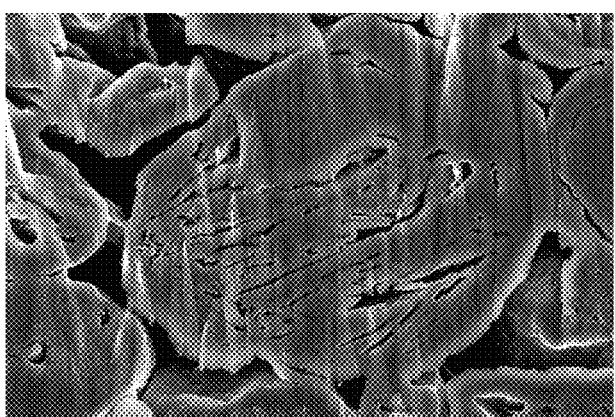
FIG. 9 is the X-ray diffraction pattern of the carbon material prepared in Comparative Example 1.

FIG. 8 is the X-ray diffraction pattern of the carbon material prepared in Example 4. FIG. 9 is the X-ray diffraction pattern of the carbon material prepared in Comparative Example 1. As can be seen from the figure, the untreated natural spherical graphite used as the carbon material in the Comparative Example 1 has more pores inside its particles, and as can be seen from the test results in Table 2, the battery prepared therefrom has a low initial coulombic efficiency and a short cycle life.

In the present application, the natural spherical graphite was mixed with a filling material such as petroleum asphalt and heat-treated, the filling material can be filled in the pore structure of the natural spherical graphite and form a carbon material with a dense external region and an internal region comprising small portion of the pore structure, and the carbon material meets the requirements of $S_2>S_1$. The pore structure of the internal region can reserve the expansion space for the change in volume of the carbon material particles, which can reduce the risk of the carbon particles' fragmentation to create new interfaces, thus reducing the occurrence of side reactions and the irreversible capacity loss of the battery. The external region has a dense structure, which can avoid as much as possible the electrolytic solution from penetrating into the internal pore structure of the carbon material particles, and thus can reduce the occurrence of side reactions. As a result, the carbon material provided in the present application has small volume expansion, high structural stability and low surface activity, and enables the battery to combine high specific capacity, high initial coulombic efficiency and long cycle life.

None of the carbon materials prepared in Comparative Examples 1-4 satisfy $S_2>S_1$, and none of them enable the battery to combine high specific capacity, high initial coulombic efficiency, and long cycle life.

The carbon materials prepared in Comparative Examples 2-3 formed a carbon layer on the surface of the natural spherical graphite, but the carbon layer only exists on the surface of the natural spherical graphite, which fails to realize the effective filling effect, and the carbon layer cannot effectively prevent the electrolytic solution from penetrating into the pore structure inside the particles, which leads to the limited improvement in the initial coulombic efficiency and the cycling performance of the battery.

In the carbon material prepared in Comparative Example 4, the filling material was filled into all the pore structures inside the natural spherical graphite particles by means of vacuuming, which leads to a larger volume change of the carbon material in the process of active ions' intercalation an deintercalation, and the particles were more easily broken, which leads to a limited improvement effect on the cycling performance of the battery.

The specific surface area, volume distribution particle size, particle size distribution, graphitization degree, powder resistivity, tap density, and other parameters of the carbon materials prepared in Examples 1-28 were within the ranges described in the specification of the present application.

As can be seen from the test results of Examples 1-28, when the carbon material further satisfied $1.5 \leq S_2/S_1 \leq 500$, optionally $2.5 \leq S_2/S_1 \leq 120$, it can further improve the initial coulombic efficiency and/or cycling performance of the battery.

Combining the test results of Examples 4 and 25-28, it can be seen that when the raw materials had different volume distribution particle sizes Dv50 and/or pore volumes, carbon materials with excellent electrochemical performance can be obtained by the preparation method of the present application.

It should be noted that the present application is not limited to the above implementations. The above implementations are only examples, and all implementations having compositions and effects substantially identical to the technical concept of the present application are included in the scope of the present application. In addition, without deviating from the gist of the present application, various variations applied to the implementations that could be conceived by those skilled in the art and other modes constructed by combining some elements of the implementations are also included in the scope of the present application.

What is claimed is:

1. A carbon material, the carbon material comprising particles, each of the particles comprising an external region and an internal region inside the external region, the external region being a region formed by extending for a distance of 0.25 L from a surface of the particle of the carbon material towards interior of the particle, L being a short-axis length of the particle of the carbon material; the particle having more than one pore structure, a total pore area of the pore structures in the external region being denoted as $S_1$ and a total pore area of the pore structures in the internal region being denoted as $S_2$, and $S_2 > S_1$, $1.5 \leq S_2/S_1 \leq 500$.

2. The carbon material according to claim 1, wherein
   $0.01 \, \mu m^2 \leq S_1 \leq 10.0 \, \mu m^2$, optionally $0.1 \, \mu m^2 \leq S_1 \leq 4.5 \, \mu m^2$; and/or
   $1.8 \, \mu m^2 \leq S_2 \leq 25.0 \, \mu m^2$, optionally $2.1 \, \mu m^2 \leq S_2 \leq 20.0 \, \mu m^2$.

3. The carbon material according to claim 1, wherein $L \geq 5 \, \mu m$, optionally $6 \, \mu m \leq L \leq 20 \, \mu m$.

4. The carbon material according to claim 1, wherein each one of the pore structures in the external region of the particles has an area of less than $0.15 \, \mu m^2$, optionally less than or equal to $0.10 \, \mu m^2$.

5. The carbon material according to claim 1, wherein each one of the pore structures in the internal region of the particles has an area of greater than or equal to $0.15 \, \mu m^2$, optionally from $0.15 \, \mu m^2$ to $2.0 \, \mu m^2$.

6. The carbon material according to claim 1, wherein the external region of the particles has an interlayer spacing denoted as $d_1$, the internal region of the particles has an interlayer spacing denoted as $d_2$, and the particles satisfy $d_1 \geq d_2$;
   optionally $d_1 > d_2$;
   optionally $d_1$ is from 0.33565 nm to 0.33615 nm;
   optionally $d_2$ is from 0.33557 nm to 0.33595 nm.

7. The carbon material according to claim 1, wherein the carbon material satisfies at least one of the following conditions:
   (1) the carbon material has a specific surface area of $\leq 2.1$ m²/g, optionally from 0.7 m²/g to 1.8 m²/g;
   (2) the carbon material has a volume distribution particle size Dv50 of 8.0 μm-25.0 μm, optionally 9.0 μm-22.0 μm;
   (3) the carbon material has a volume distribution particle size Dv90 of 16.0 μm-35.0 μm, optionally 17.0 μm-34.0 μm;
   (4) the carbon material has a particle size distribution (Dv90–Dv10)/Dv50 of 0.5-1.5, optionally 0.7-1.3;
   (5) the carbon material has a morphology comprising one or more of blocky, spherical, and quasi-spherical shapes.

8. The carbon material according to claim 1, wherein the carbon material satisfies at least one of the following conditions:
   (1) the carbon material has a graphitization degree of from 91.5% to 98%, optionally from 92% to 98%;
   (2) the carbon material has a powder resistivity under a pressure of 8 MPa of 0.009 Ω·cm-0.052 Ω·cm, optionally 0.01 Ω·cm-0.04 Ω·cm;
   (3) the carbon material has a tap density of from 0.8 g/cm³ to 1.50 g/cm³, optionally from 0.85 g/cm³ to 1.45 g/cm³;
   (4) the carbon material has a specific capacity of from 350 mAh/g to 372 mAh/g, optionally from 353 mAh/g to 371 mAh/g.

9. A secondary battery, comprising a negative electrode plate comprising the carbon material according to claim 1.

10. An electrical device, comprising the secondary battery according to claim 9.

11. A carbon material, the carbon material comprising particles, each of the particles comprising an external region and an internal region inside the external region, the external region being a region formed by extending for a distance of 0.25 L from a surface of the particle of the carbon material towards interior of the particle, L being a short-axis length of the particle of the carbon material; the particle having more than one pore structure, a total pore area of the pore structures in the external region being denoted as $S_1$ and a total pore area of the pore structures in the internal region being denoted as $S_2$, and $S_2 > S_1$, $1.8 \, \mu m^2 \leq S_2 \leq 25.0 \, \mu m^2$.

12. The carbon material according to claim 11, wherein $1.5 \leq S_2/S_1 \leq 500$.

13. The carbon material according to claim 11, wherein, $0.01 \, \mu m^2 \leq S_1 \leq 10.0 \, \mu m^2$.

14. The carbon material according to claim 11, wherein $L \geq 5 \, \mu m$, optionally $6 \, \mu m \leq L \leq 20 \, \mu m$.

15. The carbon material according to claim 11, wherein each one of the pore structures in the external region of the particles has an area of less than $0.15 \, \mu m^2$.

16. The carbon material according to claim 11, wherein each one of the pore structures in the internal region of the particles has an area of greater than or equal to $0.15 \, \mu m^2$.

17. The carbon material according to claim 11, wherein the external region of the particles has an interlayer spacing denoted as $d_1$, the internal region of the particles has an interlayer spacing denoted as $d_2$, and the particles satisfy $d_1 \geq d_2$.

18. The carbon material according to claim 11, wherein the carbon material satisfies at least one of the following conditions:
   (1) the carbon material has a specific surface area of $\leq 2.1$ m²/g, optionally from 0.7 m²/g to 1.8 m²/g;
   (2) the carbon material has a volume distribution particle size Dv50 of 8.0 μm-25.0 μm, optionally 9.0 μm-22.0 μm;
   (3) the carbon material has a volume distribution particle size Dv90 of 16.0 μm-35.0 μm, optionally 17.0 μm-34.0 μm;
   (4) the carbon material has a particle size distribution (Dv90–Dv10)/Dv50 of 0.5-1.5, optionally 0.7-1.3;
   (5) the carbon material has a morphology comprising one or more of blocky, spherical, and quasi-spherical shapes.

19. The carbon material according to claim 11, wherein the carbon material satisfies at least one of the following conditions:
   (1) the carbon material has a graphitization degree of from 91.5% to 98%, optionally from 92% to 98%;
   (2) the carbon material has a powder resistivity under a pressure of 8 MPa of 0.009 Ω·cm-0.052 Ω·cm, optionally 0.01 Ω·cm-0.04 Ω·cm;
   (3) the carbon material has a tap density of from 0.8 g/cm³ to 1.50 g/cm³, optionally from 0.85 g/cm³ to 1.45 g/cm³;
   (4) the carbon material has a specific capacity of from 350 mAh/g to 372 mAh/g, optionally from 353 mAh/g to 371 mAh/g.

* * * * *